United States Patent [19]
Watanabe et al.

[11] 3,787,863
[45] Jan. 22, 1974

[54] RADIO ANGLE MEASUREMENT APPARATUS

[76] Inventors: Masaru Watanabe; Nobuharu Yamauchi; Naoki Hashimto; Tetsuo Tamama, all of c/o Communication Equipment Works of Mitsubishi Denki Kabushiki Kaisha, No. 80, Nakano, Minami Shimizu, Amagasaki, Hyogo Prefecture, Japan

[22] Filed: Dec. 30, 1971

[21] Appl. No.: 214,495

Related U.S. Application Data
[63] Continuation of Ser. No. 854,406, Sept. 2, 1969, abandoned.

[30] Foreign Application Priority Data
Sept. 5, 1968 Japan.................................. 43/63940

[52] U.S. Cl............................................. 343/113 R
[51] Int. Cl................................................ G01s 3/46
[58] Field of Search ................................. 343/113 R

[56] References Cited
UNITED STATES PATENTS
2,976,530   3/1961   Werner et al................ 343/113 R X

*Primary Examiner*—Benjamin A. Borchelt
*Assistant Examiner*—Richard E. Berger
*Attorney*—Robert E. Burns et al.

[57] ABSTRACT

This invention relates to a radio angle measurement apparatus, which is applicable to radar and other detection systems and which utilizes antenna array system(s) with radiator elements distributed at a spacing larger than one half of the propagation wavelength.

At least two values of $d/\lambda$ (where $d$ is the said radiator elements spacing, $\lambda$ the propagation wavelength) are employed. There are, furthermore, a set of phase discriminating means, one for each one $d/\lambda$ value, for discriminating the phase difference between the signals that are received by neighboring elements of antenna arrays, and a phase-difference-to-angle correlating means for correlating measured sets of said phase differences to the incident angle of the signal, making use of the either theoretically or experimentally known relationships between said sets of phase differences and the incident angle of the signal. In the above correlation process, a consideration of the role played by the resolution of phase discrimination is given, which helps to construct optimal embodiments of the invention, to maximize the possibility of accurate angle measurement.

14 Claims, 40 Drawing Figures

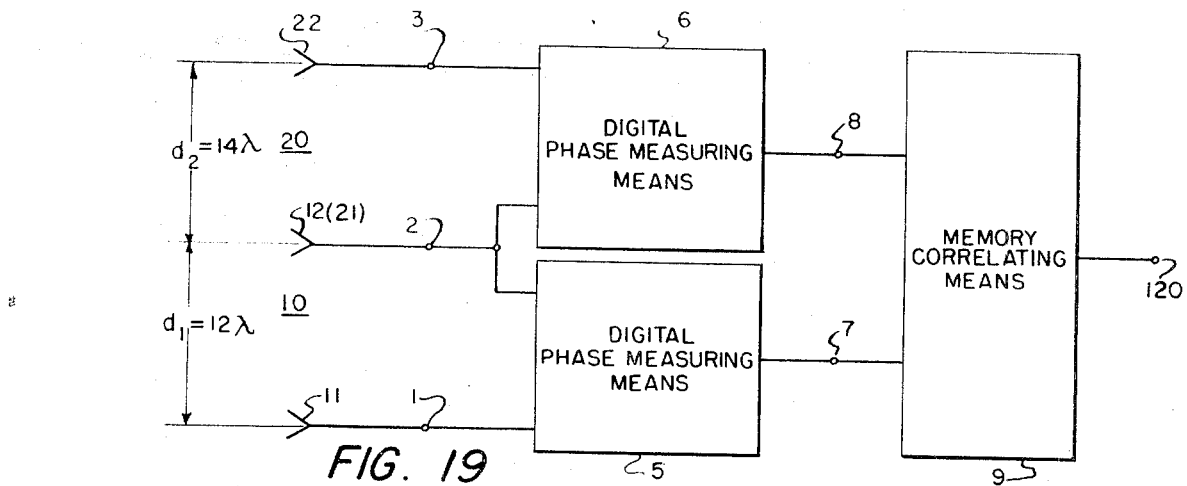
FIG. 19
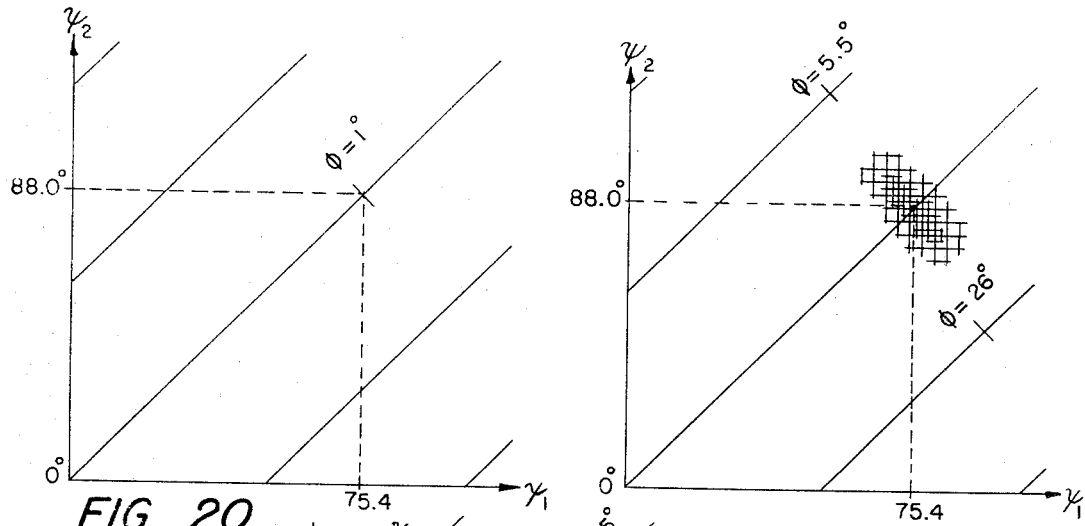
FIG. 20
FIG. 21
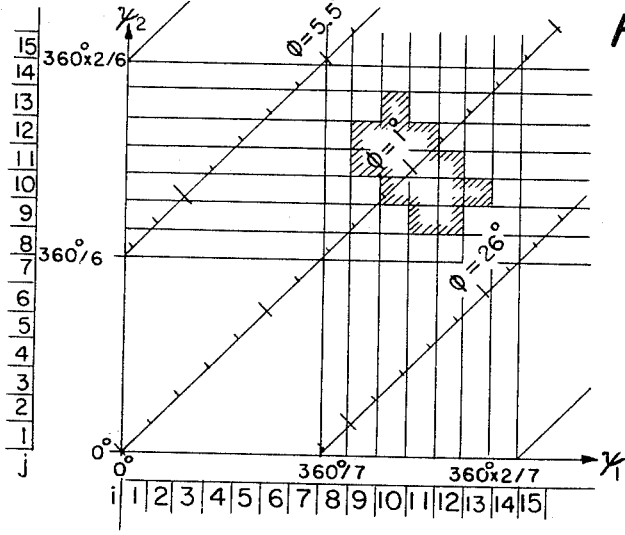
FIG. 22

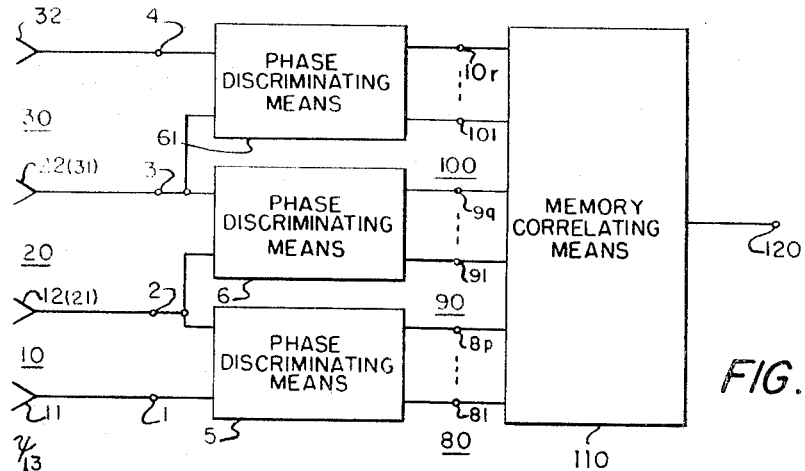
FIG. 35
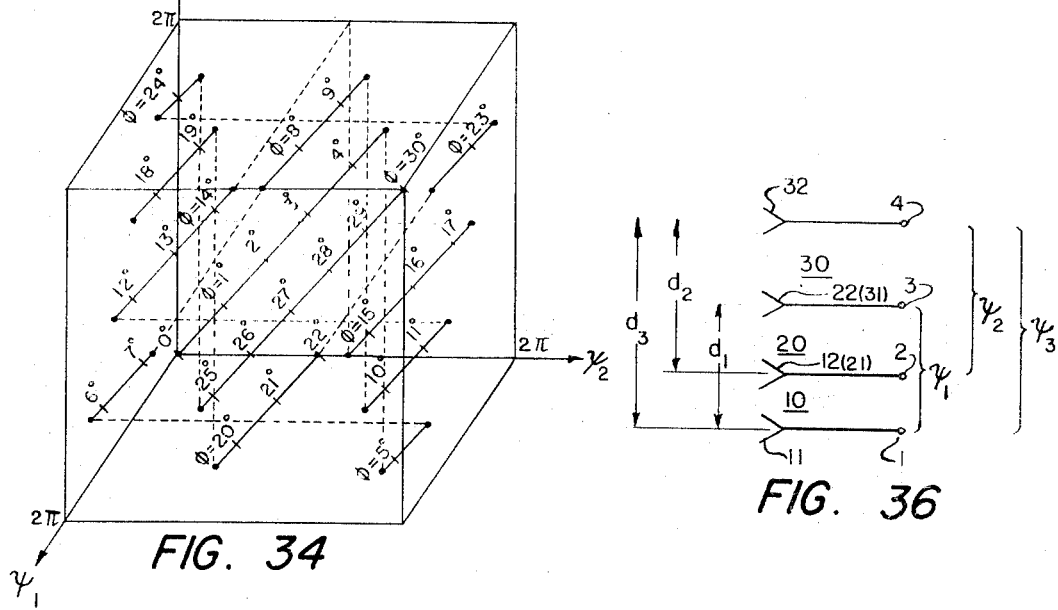
FIG. 34
FIG. 36
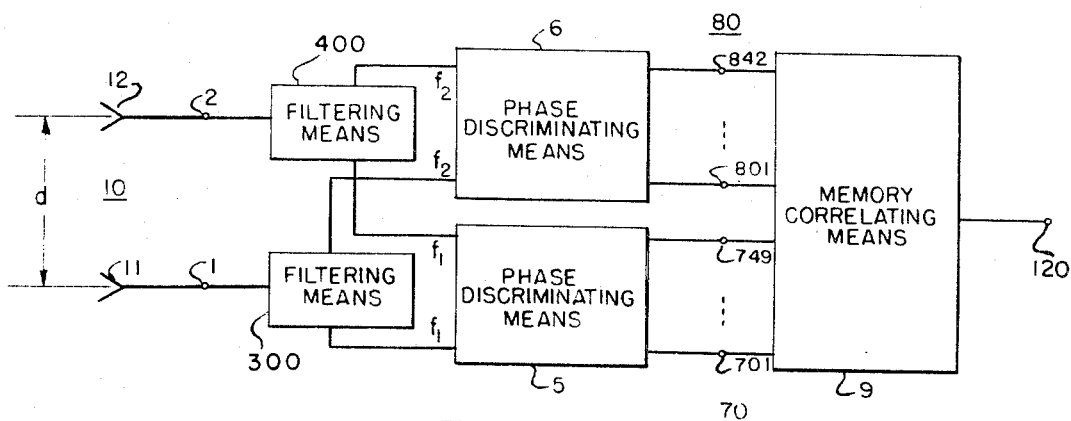
FIG. 37

RADIO ANGLE MEASUREMENT APPARATUS

This is a continuation of application Ser. No. 854,406, filed Sept. 2, 1969, now abandoned.

BACKGROUND OF THE INVENTION

1. Field of the Invention

This invention relates to a radio angle measurement apparatus, which is applicable to radar and other detection systems and which utilizes antenna array system(s) with radiator elements distributed at a spacing larger than one half of the propagation wavelength, and which measures the incident angle of signal via the discrimination of phase differences between the signals that are received by neighboring elements of antenna arrays.

2. Description of the Prior Art

The principle of the phased array antennas is widely known: if two or more radiator elements of generally identical characteristics are "arrayed" with an element spacing of $d$ and each element is excited with a phase difference $\psi$ introduced between neighboring elements, then the angle $\phi$ of the direction toward which transmitted wave propagates, measured from the array broadside, is determined by following equation:

$$\psi = 2\pi/\lambda \, d \sin \phi, \tag{1}$$

where $\lambda$ is the propagation wavelength.

In other words, a directivity lobe is formed whose nose direction is given by $\phi$ in equation (1). The same equation holds for receiving mode also: received signal output is maximum for a signal incident from the direction $\phi$ in equation (1). In other words, a directivity lobe of reception is formed in that direction. It is also known that the width of the lobe, $\phi_n$, measured between the nulls, is given by $$\phi_n \approx 2\lambda/md, \tag{2}$$

where $m$ is the number of radiator elements arrayed.

This is the well-known fundamental principle of a phased array antenna, which renders itself to several useful modifications:

Method (i): The phase difference $\psi$ may be varied with reference to time, to effect beam steering as the angle $\phi$ is accordingly varied; this is the essence of electronic beam scanning. If suitable phase shifters are used, this is phase scanning; if, instead, transmitting and receiving frequency is varied, to produce phase difference due to varied guide wavelength, this is frequency scanning. This method can receive signals only from the direction toward which the scanned beam is directed, with the result that the data rate is limited and a comparatively long time is required to cover a specified portion of space.

Method (ii): The received signal, after amplification, may be divided into many parallel channels, and fixed but different inter-element phase shifts may be introduced into each of the channels. Then each channel corresponds to different beam position and we now have many simultaneous receiving beams from a single array. This is the essence if multi-beam receiving array. In this case, the transmission may be performed by a separate antenna system, with a broader directivity pattern. This method has the advantage of higher data rate due to the generation of plurality of mutually distinguishable beams, thereby reducing the time required to cover a specified portion of space. On the other hand, the necessity to provide multiple channels for each of the beams makes the system cumbersome and complicated.

Method (iii): Multi-beam formation is not the only way to detect multiple directions by a single array. If we operate the array in receiving mode only, with a separate transmitter and if the direct measurement of the phase difference between the signals received by neighboring elements, $\psi$, is possible, then an instant recognition of the incident wave direction, $\phi$, is possible from the simple relationship of equation (1). This is a convenient method because it has all the merits of the above Method (ii) while avoiding the necessity for multiple channels. On the other hand, the direct measurement of the phase difference may not always be feasible, depending upon the system parameters.

It may be summarized that firstly, the above Methods (ii) and (iii) are complementary in nature and either may be used as the system parameters dictate; and that, secondly, the above Methods (i) and (ii) are special cases of the Method (iii). The latter point will be apparent if we consider that the beam direction $\phi$ in equation (1) is none other than the direction in which the signals of neighboring channels, after passing through the phase shift $\psi$, coincide in phase; the Methods (i) and (ii), therefore, substitute the direct phase measurement of the Method (iii) by introducing known phase difference between the channels and then detecting the phase null in the form of beam formation in that direction.

A phased array antenna, otherwise a very useful means for radio angle measurement as is seen above, exhibits a serious difficulty stemming from the fact that the phase inherently recurs every $2\pi$ radians or 360°, and that a phase in more than that amount cannot be discriminated from one in less than that amount. By putting $\psi = 2\pi$ in equation (1), we have $$\phi = \sin^{-1}(\lambda/d). \tag{3}$$

This shows the limit of the angle sector in which an unambiguous angle determination is possible. Denoting this angle by $\Phi$, and refering to it hereinafter as "the unambiguous sector," it is governed by the value $d/\lambda$, the array element spacing in terms of propagation wavelength. The unambiguous sector is reduced as the element spacing is increased. Now it is generally preferable to keep element spacing large from the standpoint of radiator element design (to allow larger gain and more elaborate element characteristics design by use of larger elements) and from the standpoint of angle accuracy (same angle produces larger phase difference for larger spacing). But this naturally reduces the unambiguous sector.

The conventional way of surmounting this difficulty has been to adopt a small value of $d/\lambda$ (usually about one-half) and to increase the number of elements to be arrayed; this solved the problem of small gain, and also resulted in improved accuracy of angle measurement, due to, so to speak, accumulation of many phase data in every measurement. But this makes the number of elements and associated channels very large, in some cases where radiator elements are arrayed in two dimensions to form a "planar array," the number amounting to tens of thousands.

Other recent scheme to surmount this difficulty has come to be known, through which it is possible to use a large value of $d/\lambda$, a small number of radiator elements and still obtain a large unambiguous sector. The essence of this scheme is the utilization of plurality of antenna arrays with different values of $d/\lambda$: if we have two arrays with different element spacings of $d_1$ and $d_2$ respectively, and if two different phase differences, $\psi_1$ and $\psi_2$ respectively, are introduced between the neighboring elements of each of the arrays, then we have, instead of equation (1), $$\psi_1 = (2\pi/\lambda) d_1 \sin \phi,$$

(4)

$$\psi_2 = (2\pi/\lambda) d_2 \sin \phi,$$

(5)

If, moreover, we keep $$\psi_1/\psi_2 = d_1/d_2,$$

(6)

then two values of phase differences in accordance with equations (4) and (5), ($\psi_1$, $\psi_2$), correspond to one value of angle $\phi$; $\phi$ now is a function of two phase variables ($\psi_1$, $\psi_2$) instead of one, as used to be the case formerly. It can be assumed, without loss of generality, that $$d_1/\lambda < d_2/\lambda .$$

(7)

Then, when $\psi_2$ reaches 360°, $\psi_1$ does not yet; when $\psi_1$ does, $\psi_2$ is past 360°, or past 0°, and assumes a different value; thus the value of ($\psi_1$, $\psi_2$), seen as a set, is different, and the unambiguous determination of angle $\phi$ is still possible. The unambiguous sector is now wider than the case when either one of the spacings $d_1$ or $d_2$ is used separately.

Several embodiments of the prior art will now be described, which belong to the above scheme of utilizing different values of $d/\lambda$. It can be seen that the employment of antenna arrays in the embodiments here described mostly falls within the scopes of either one of the aforementioned Methods (i), (ii) or (iii).

The first embodiment has appeared in publications in U.S.A. in recent years, for instance in the 1965 I.E.E.E. International Convention Record, Part 5, Pages 110 through 120, in which it was reported that two antenna arrays, one for transmission with a value of $d_1/\lambda \approx 14$ and another for reception with a value of $d_2/\lambda \approx 15$ were used. By keeping the inter-element phase shift $\psi_1$, $\psi_2$ to be, in accordance with equation (6), $$\psi_1/\psi_2 = 14/15 ,$$

a fairly wide unambiguous sector was obtained.

The employment of antenna arrays in this embodiment belongs to the aforementioned Method (i), and shares its disadvantage in that the data rate is limited and a comparatively long time is required to cover a specified portion of space. It was, moreover, necessary to accomodate a fairly large number of elements, approximately 30 per array, in order to realize a suitably narrow beamwidth, in accordance with equation (2).

The second embodiment is an invention of one of the present applicants, and is patented, for instance, as U.S. Pat. No. 3,308,465. The employment of antenna arrays in this embodiment belongs to the Method (ii): a multi-lobe receiving array is formed by dividing the received signal into many parallel channels, thereby acquiring high data rate. A beam shaping means was introduced, moreover, thereby liberating the beamwidth from the relationship of equation (2), with the result that the number of radiator elements was drastically reduced, the minimum total number being three, even when two arrays are employed. Another result of beam shaping was that the resolution of phase measurement was notably increased with more ease than was formerly possible with the Method (ii), and this embodiment constitutes one basis of the present invention. No sufficient consideration, however, was paid in the process of correlating the incident angle to the measured values of phase differences, and it was not always possible to maximize the possibility of accurate angle measurement.

The third embodiment is patented as Japanese Patent 487,037. With the knowledge that, in equation (1), the determining factor of the relationship between angle $\phi$ and phase $\psi$ is the value of $d/\lambda$, this embodiment employs, instead of one common value of $\lambda$ and two different values of $d_1$ and $d_2$, two different values of $\lambda_1$ and $\lambda_2$ and one common value of $d$, with the result that the following two equations hold instead of equations (4) and (5):

$$\psi_1 = (2\pi/\lambda_1) d \sin \phi ,$$

(8)

$$\psi_2 = (2\pi/\lambda_2) d \sin \phi ,$$

(9)

The same effect as the previous embodiments can be obtained if we keep $$\psi_1/\psi_2 = \lambda_2/\lambda_1$$

(10)

This embodiment has the advantage of requiring only one value of inter-element spacing $d$, resulting in, when minimum, only two radiator elements even when two values of $d/\lambda$ are employed. In other aspects, it shares advantages and Phase-Difference To Angle with the last embodiment.

The fourth embodiment is a British experiment which has been reported in the Netherlands, published in the Philips Technical Review, Volume 28, No. 5/6/7, Pages 226 through 230. Three antenna arrays with inter-element spacings of $d_1:d_2:d_3 = 1:4:16$ were used, and the measurement of phase differences is performed in a manner that falls between the aforementioned Methods (ii) and (iii): the received signal is divided into many parallel channels and different inter-element phase shifts are introduced into each of the channels as in Method (ii), while a higher resolution in phase measurement than is usually possible by the Method (ii) and the quantization of measured phase values are made possible, thus approximating the Method (iii), through a contrivance to subtract the outputs of said channels in suitable combination and to detect the polarity of the resultant difference.

It is found with this embodiment, however, that in the quantization process, certain interdependence exits between the resolution of phase measurement and the inter-element spacing, and it is not easy independently to select optimal spacing and optimal resolution for every application. More numbers of parallel channels, besides, are required to increase the resolution of phase measurement, so that the resolution achieved in the report was no more than 360°/8°; and the embodiment shares the disadvantage with the second embodiment, in that no sufficient consideration was paid in the process of correlating the incident angle to the measured values of phase differences.

The fifth embodiment are inventions of some of the present applicants, and are patented as Japanese Patents 501,974 and 506,157. The antenna arrays employed therein belong to the Method (iii); the interelement phase differences were directly measured, making use of such devices as phase-sensitive detectors and A–D convertors, and the signal incident angle was obtained from the measured phase differences. This embodiment has the advantages of requiring as few as three radiator elements as in the case of the above second embodiment, and avoiding the necessity of multiple channels as in the case of the above second and fourth embodiments, and it constitutes another basis of the present invention. This embodiment, however, also shares the disadvantage with the second embodiment in that no sufficient consideration was paid in the process of correlating the incident angle to the measured values of phase differences.

The object of the present invention, then, is to provide the means to overcome the disadvantages of all the above embodiments that represent the prior art.

The object of the present invention, more precisely, is to provide the means to realize a radio angle measurement apparatus, which is applicable to radar and other detection systems and which exhibits the following features:

1. The inter-element spacings of the antenna arrays are considerably larger than one half of the propagation wavelength, thus making room for larger gain and more elaborate characteristics design of the radiator elements, as well as permitting a higher angular accuracy due to the fact that a small amount of angle produces a large phase difference for a large spacing.

2. The unambiguous sector is large.

3. At least two different values of $d/\lambda$ (where $d$ is the interelement spacing, $\lambda$ the propagation wavelength) are used with the antenna arrays, while the total number of radiator elements is small; high angular accuracy is achieved with a total of three or four radiator elements, the minimum possible number being two.

4. Detection of multiple directions is possible and data rate is high; spatial scanning of beam is eliminated.

5. A consideration is paid to the process of correlating the measured sets of inter-element phase differences to the incident angle of signal, and particularly to the role played by the resolution of phase discrimination; with the result that it is possible to construct optional embodiments, to maximize the possibility of accurate angle measurement.

6. The degree of freedom is large in selecting the ratio of $d/\lambda$ values of antenna arrays, and it is possible independently to select optimal spacing and optimal resolution of phase measurement for every application.

It should be noted here that (1) through (4) of the above features are provided by the aforementioned prior inventions of some of the present applicants; the object of the present invention is to provide the above (5) and (6) while maintaining the (1) through (4) intact.

SUMMARY OF THE INVENTION

Briefly, these and other objects of the present invention are accomplished as follows:

I. A radio signal of incident angle $\phi$ is received by antenna arrays that exhibit at least two different values of $d/\lambda$ (where $d$ is the inter-element spacing of the radiator element, $\lambda$ the propagation wave-length); the resultant inter-element phase differences, of which there are at least two sets, $\psi_1$, $\psi_2$, etc., in accordance with the difference in $d/\lambda$ values, are measured.

II. In the process of measurement of each phase difference, either one of the following two devices are used, to obtain the phase difference data with high resolution and in quantized or digitized form: (a) a phase discriminating means which produces quantized phase data in such a manner that there are a plurality of output terminals, each of which corresponds to a certain small increment of phase, so that a certain amount of phase should cause an output signal to appear on certain corresponding terminal(s); (b) a digital phase measuring means which measures phase difference directly and with high resolution.

III. The incident angle of the signal is obtained by a phase-difference-to-angle correlating means which correlates all or a part of the measured sets of said phase differences to the incident angle of the signal, making use of the previously memorized angle values derived from either theoretically or experimentally known relationship there-between.

IV. To a certain value of the incident angle, a certain sets of phase differences $\psi_1$, $\psi_2$, etc., are correlated. The domain of said sets of phase $\psi_1$, $\psi_2$, etc., to be correlated to a certain value of the angle (hereinafter to be refered to as "phase domain") does not necessarily represent such rectangular or cubic rectangular shape within the ($\psi_1$, $\psi_2$, ...) space as expressed by $\alpha$ $\psi_1$ $4\beta, \gamma$ $\psi_2$ $\delta$, etc. (where $\alpha, \beta, \gamma$ and $\delta$ are constants.) The phase domain may be made to represent, as a sum of rectangular or cubic rectangular shapes, such polygonal or polyhedral shape within the ($\psi_1$, $\psi_2$, ...) space as to fit the shape of error distribution of ($\psi_1$, $\psi_2$, ...). The high resolution of phase measurement, mentioned in the above (II), allows a high degree of freedom in causing said polygonal or polyhedral shape to best fit the shape of error distribution, thereby maximizing the possibility of accurate angle measurement. The high resolution also contributes to the degree of freedom in the choice of ratio of $d/\lambda$ values of antenna arrays, thereby permitting the apparatus to adapt to various applications.

V. The locus within the ($\psi_1$, $\psi_2$, ...) space of phase differences ($\psi_1$, $\psi_2$, ...) that correspond to various values of incident angle generally represents straight lines, which are parallel to none of the $\psi_1$, $\psi_2$, ... axes. In order to maximize the possibility of accurate angle measurement, it is desirable to align the phase domains along and around said locus. Consequently the relative position of adjacent phase domains is not parallel to any of the $\psi_1$, $\psi_2$, ... axes. As the result of this, the following statement obtains: as the incident angle continuously varies, phase differences $\psi_1$, $\psi_2$, etc., also vary; while one of the phase differences $\psi_1$, $\psi_2$, etc., let us say $\psi_1$, varies from 0° to 360° there occurs, at least once, a point where either (a) the value of other phase difference(s), let us say $\psi_2$, etc., that has so far been made a set with that of $\psi_1$, is no longer so, or (b) the value of said $\psi_2$, etc., that has not so far been made a set with that of $\psi_1$, is now made a set therewith. By shaping the phase domain in this manner, the possibility of accurate angle measurement is increased.

DESCRIPTION OF THE DRAWINGS

These and other advantages of the present invention will be more apparent when considered in reference to the following descriptions and drawings, throughout which drawings like characters indicate like parts, and of which:

FIG. 19 is a diagram in schematic form of an embodiment of the present invention, constituted by the means shown in FIGS. 1, 11 and 16;

FIGS. 20 through 23 are descriptive graphic diagrams showing the function of the means shown in FIGS. 18 and 19;

FIG. 34 is a graphic diagram showing the functional relationship between the signal incident angle and phase differences in relation to the antenna array system of FIG. 33;

FIG. 35 is a diagram in schematic form of an embodiment of the present invention, utilizing the antenna array system of FIG. 33;

FIG. 36 is a diagram of still another example of antenna array system utilized in the present invention;

FIG. 37 is a diagram in schematic form of another embodiment of the present invention:

DESCRIPTION OF PREFERED EMBODIMENT

The prefered embodiment of the present invention will now be described in detail and in the following four steps:

1. Embodiment of antenna array system,
2. Embodiment of phase difference measuring means,
3. Embodiment of phase-difference-to-angle correlating means, and
4. Embodiment of the entire apparatus.

Embodiment of antenna array system

Figure 1:
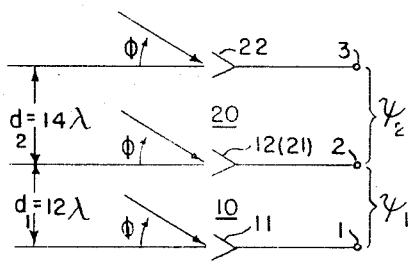
FIG. 1 is a diagram of an example of antenna array system utilized in the present invention.

Refering now to the drawings for a more detailed understanding of the invention, and in particular, to FIG. 1 thereof, there is shown an example of antenna array system that constitutes a part of the embodiment, in which 10 is the first antenna array comprising radiator elements 11, 12 distributed at an inter-element spacing $$d_1 = 12\lambda, \tag{11}$$

where $\lambda$ is the propagation wavelength, and 20 is the second antenna array comprising radiator elements 21, 22 distributed at an inter-element spacing $$d_2 = 14\lambda \quad (12)$$

The figure shows the case where one of the radiator elements is used commonly by two arrays, as designated 12(21), thus making the total number of radiator elements three. The outputs from the radiator elements 11, 12(21) and 22 are observed at the output terminals 1, 2 and 3 respectively. Supposing that there is a radio signal coming from the direction of incident angle $\phi$, measured from the array broadside, then there will appear, as has previously been explained, phase differences $\psi_1$, $\psi_2$ between the signals observed at the output terminals 1, 2 and 3, which are expressed as:

$$\psi_1 = (2\pi/\lambda)d_1 \sin \phi , \quad (4)$$

$$\psi_2 = (2\pi/\lambda)d_2 \sin \phi , \quad (5)$$

and the incident angle $\phi$ is expressed as a function of two phase variables ($\psi_1$, $\psi_2$). By eliminating $\sin \phi$ from equations (4) and (5), we have $$\psi_1/d_1 = \psi_2/d_2 \quad (13)$$

which represents a locus of set of ($\psi_1$, $\psi_2$) in relation to the variation of the incident angle. It is a straight line within the ($\psi_1$, $\psi_2$) plane, and will hereinafter be called "phase locus." By substituting eqations (11) and (12) into (4), (5) and (13), we have $$\psi_1 = 12 \times 360° \sin \phi , \quad (14)$$

$$\psi_2 = 14 \times 360° \sin \phi , \quad (15)$$

$$\psi_1/6 = \psi_2/7 . \quad (16)$$

Figure 2:
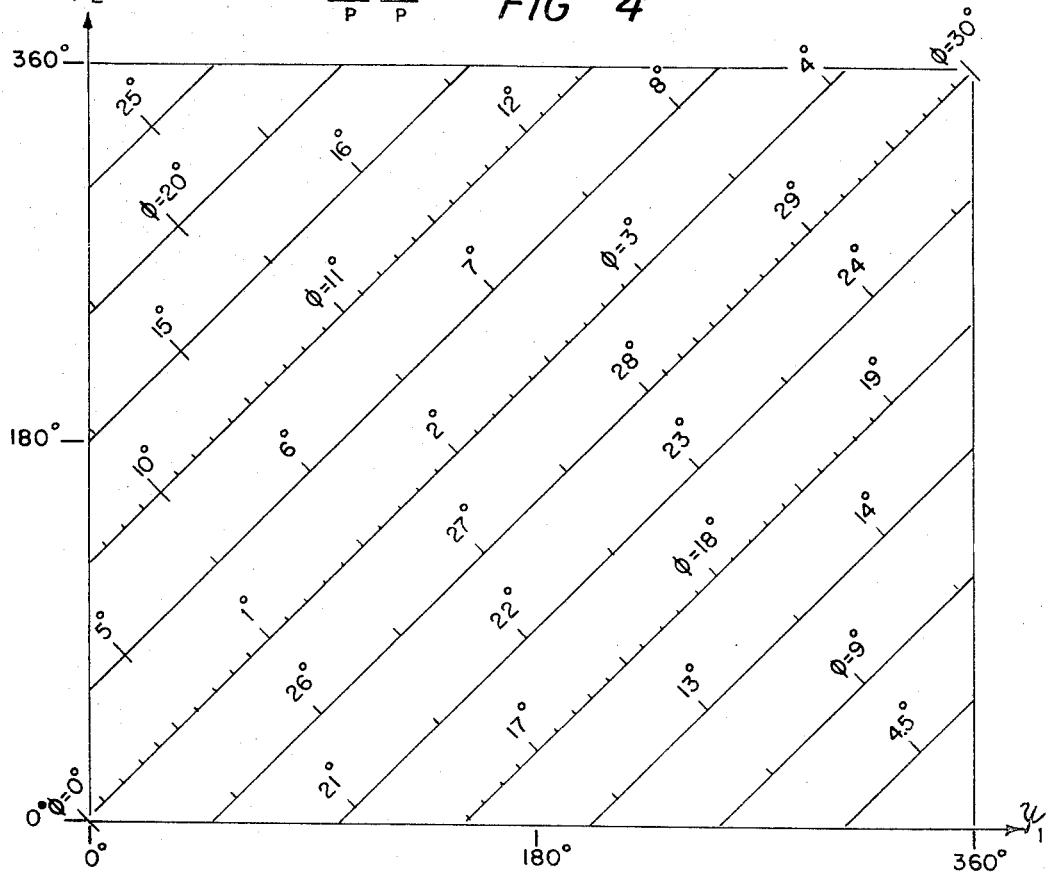
FIG. 2 is a graphic diagram showing the functional relationship between the signal incident angle and phase differences in relation to the antenna array system of FIG. 1.

Plotting the phase locus graphically, with consideration to the fact that phases ($\psi_1$, $\psi_2$) recur every 360°, we obtain FIG. 2, in which the corresponding values of $\phi$ is shown on scale. It is notable that the phase locus is parallel to neither $\psi_1$ nor $\psi_2$ axes, but has some inclination toward them; this fact bears significance to the phase-difference-to-angle correlation method of this invention which will be described later. It can be seen from FIG. 2 that, whereas the unambiguous sector of array antenna system of either $d_1 = 12\lambda$ or $d_2 = 14\lambda$ when used separately is only 4.76° or 4.09°, the combination of those two, by making incident angle a function of two variables, has widened the unambiguous sector to 30°.

Said incident radio signal may either be a radio wave emanating from an object or be an reflected radio echo from an object of a transmitted wave that originated from a transmitting means and a transmitting radiator; in the latter case, the transmitting means and the transmitting radiator may either be separately installed, or be incorporated into the embodiment of invention, making radiators of FIG. 1 serve dual purpose of transmission and reception. Since any of above cases evidently do not place obstacle to the application of the invention, the description hereafter will concern itself with the case where radio signal is received by the embodiment, without particular regard to the origin of the incident signal.

Embodiment of phase difference measuring means

It is desirable for the embodiment of the invention to have a phase difference measuring means which is capable of discriminating in quantized or digitized form and with high resolution the phase difference between two channels.

Figure 3:
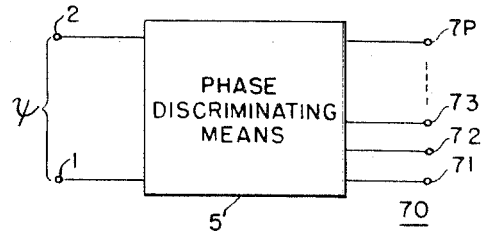
FIG. 3 is a diagram in schematic form of an example of phase difference measuring means that constitutes a part of an embodiment of the present invention.
Figure 4:
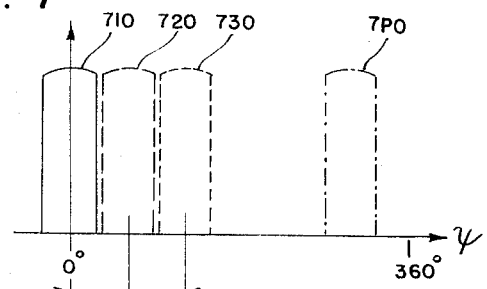
FIG. 4 is a descriptive graphic diagram showing the function of the means shown in FIG. 3.

Refering now to FIG. 3, there is shown one such means which produces quantized phase data in such a manner that a certain amount of input phase difference causes an output signal to appear on certain corresponding output terminal(s). In FIG. 3, 1 and 2 are input terminals of two input signal channels between which a phase difference to be discriminated, $\psi$, appears; 5 is a phase discriminating means, 70 is an output terminal group comprising a plurality of output terminals 71, 72, 73, . . . 7p. The phase discriminating means 5 functions in such a manner that a certain amount of phase difference causes an output signal to appear on certain corresponding output terminal(s) as shown graphically in FIG. 4, in which the output signals that appear on terminals 71, 72, 73, . . . , 7p, as $\psi$ on the abscissa varies, are denoted 710, 720, 730, . . . . It can be seen that, starting from 0°, every 360°/p° increment of $\psi$ causes the output to appear on different terminal. Realization of such a high-resolution phase discriminating means has been described in the aforementioned U.S. Pat. No. 3,308,465.

Figures 5, 8:
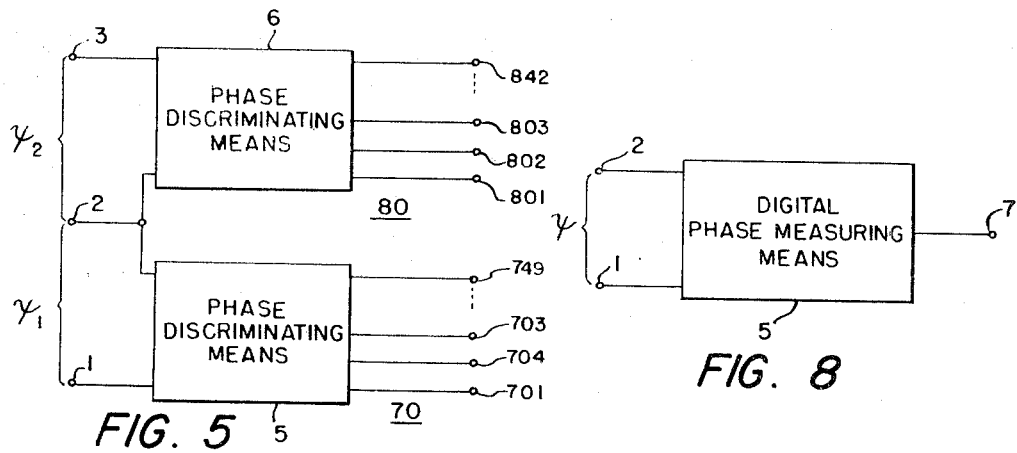
FIG. 5 is a diagram in schematic form of the means shown in FIG. 3, arranged in a particular configuration suitable to be combined with the antenna array system of FIG. 1.
FIG. 8 is a diagram in schematic form of another example of phase difference measuring means that constitutes a part of an embodiment of the present invention.
Figure 6:
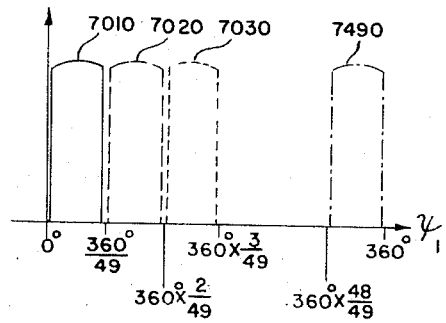
FIGS. 6 and 7 are descriptive graphic diagrams showing the function of the means shown in FIG. 5.
Figure 7:
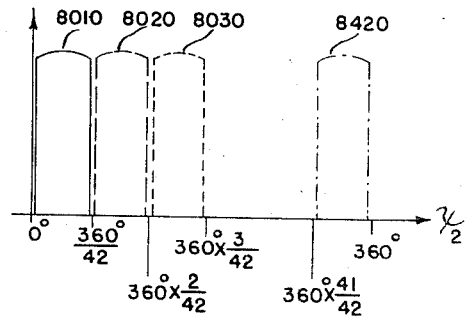

FIG. 5 shows phase difference measuring means according to FIG. 3, arranged in a particular configuration suitable for the application of the present example, and in which 1, 2, 3 are input terminals of three input signal channels between which phase differences to be discriminated, $\psi_1$, and $\psi_2$ respectively, appear; 5 and 6 are phase discriminating means, 70 is an output terminal group comprising 49 output terminals 701, 702, 703, . . . 749, and 80 is an output terminal group comprising 42 output terminals 801, 802, 803, . . . , 842. FIGS. 6 and 7 show graphically the output signals 7i0 (i = 01, 02, 03, . . . 49) and 8j0 (j = 01, 02, 03, . . . , 42) that appear on terminals 7i and 8j, as phase differences $\psi_1$ and $\psi_2$ vary; it can be seen that, starting from 0°, every 360°/49° increment of $\psi_1$ and every 360°/42° increment of $\psi_2$ cause the outputs to appear on diferent terminals. The abscissa of FIG. 6 is biased in amount of 360°/98° in comparison with that of FIG. 4; this can easily be accomplished by inserting a phase shifter element in amount of 360°/98° in series to, say, the terminal 1 of FIG. 5. This modification is made for the benefit of description from now on, and there is no essential difference between the two Figures. The same applies to FIG. 7.

Consequently, an output signal appears on terminal 7i when $$(i-1)/49 \times 360° \leq \psi_1 \leq i/49 \times 360°, i = 1, 2, 3, \ldots , 49, \quad (17)$$

and so does an output signal on terminal 8j when $$(i-1)/49 \times 360° \leq \psi_i \leq i/49 \times 360°, j = 1, 2, 3, \ldots, 42,$$

(18)

It is apparent here that the output signals need not exactly appear only on the above terminals, but may appear on a few adjacent terminals as well; because there is no difficulty, in that case, to equip the phase discriminating means with a function to distinguish which terminal is the center. It should also be noted that the description so far does not depend on the waveform of the signal (continuous or pulsed, etc); it is apparent that the phase can be discriminated instantly and at every point in time, without regard to signal waveform.

Referring now to FIG. 8, there is shown another example of phase difference measuring means which constitutes the embodiment, and which directly measures phase difference digitally and with high resolution. In FIG. 8, 5 is a digital phase measuring means, 7 is or output terminal, and other like characters indicate like parts as in FIG. 3. The digital phase measuring mens 5 so functions as to yield on terminal 7 the value of phase difference $\psi$ directly in a digital form and with high resolution, which function may be realized as follows.

Figure 9:
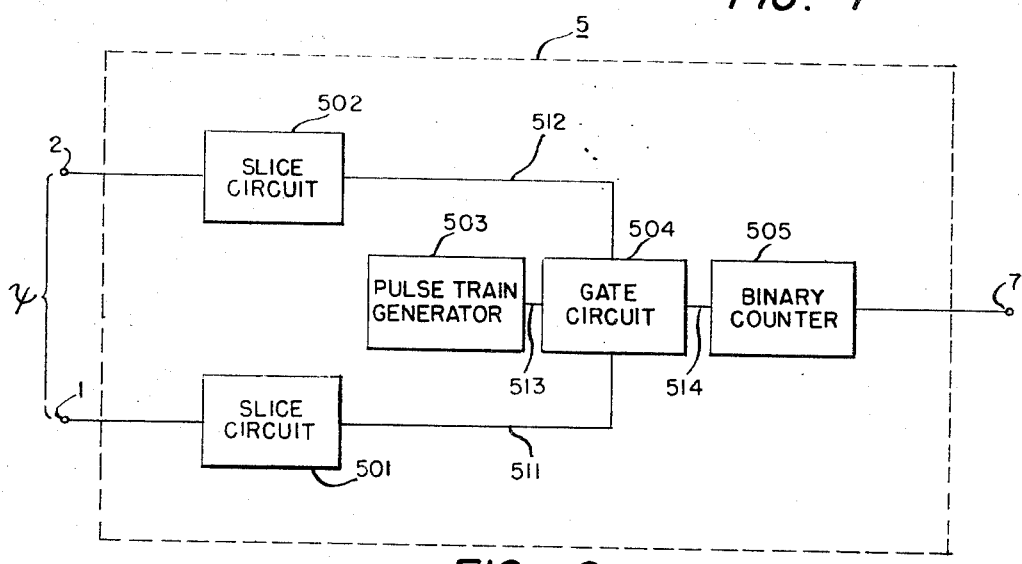
FIG. 9 is a diagram showing an example of internal structure of the means shown in FIG. 8.
Figure 10:
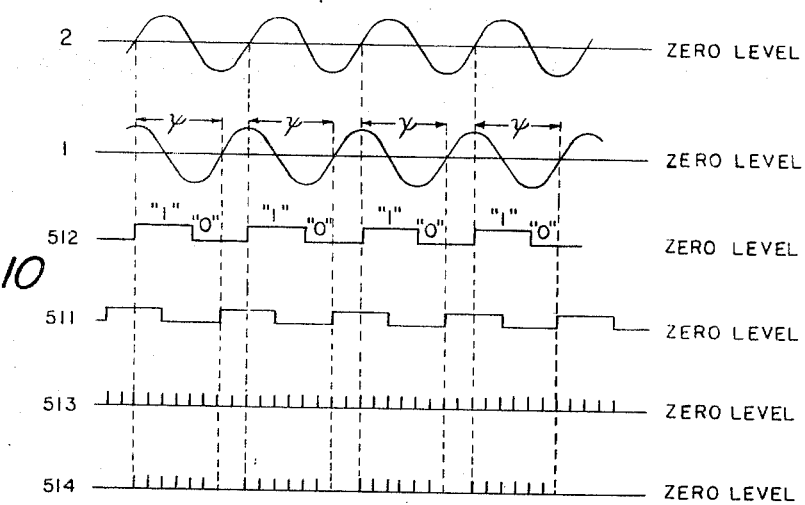
FIG. 10 is a descriptive graphic diagram showing the function of the means shown in FIG. 9.

In reference to FIG. 9, 501 and 502 are means generally known as A/D convertor or slice circuit whose function is to compare input signal with certain threshold level, in order thereby to judge the presence, absence or magnitude of the signal; 503 is a pulse train generator, 504 is a gate circuit 505 is a binary counter which counts the number of input pulses and yield the number as its output in binary form, and 511 through 514 are lead wires connecting the parts to each other as shown. Other like characters indicate like pats as in FIG. 8. An example of waveforms within the means of FIG. 9 is shown in FIG. 10, at whose left-hand extreme are numbers designating the corresponding parts of FIG. 9 where the waves appear. Supposing that there are signals coming into terminals 1 and 2, with a phase different $\psi$ therebetween, and that said signals are applied to slice circuits 501 and 502 whose threshold is set at zero level, then there appear at the output lead wires 511 and 512, as shown in FIG. 10, signals of constant level whose duration is determined by the duration of one particular polarity of said input signals. Hereafter the presence and absence of signal will be expressed by logic code "1" and "0" respectively in like manner, a level above the zero level in FIG. 10 will be expressed by "1" and the zero level by "0." The pulse train generator 503 generates a continuous train of pulse onto the lead wire 513, and the gate circuit 504 lets the pulse train go through during a time that corresponds to the phase difference $\psi$. This is accomplished by causing said gate circuit 504 to open the gate and let the pulse train go through when the signal on said lead wire 512 goes from "0" to "1," and to close the gate and block the pulse train when the signal on said lead wire 511 goes from 0 to "1," thereby causing the pulses to appear on said lead wire 514 whose number is proportionate to the amount of $\psi$. Opening and closing the gate when the signals go from "1" to "0" yields the same results. The number of pulses on said lead wire 514 is counted by the binary counter 505, and the resultant binary number, proportionate to the amount of $\psi$, is obtained on output terminal 7 on a real time basis, that is simultaneously with the application of input signals.

The relation-ship between the phase difference $\psi$ and the number $n$, of pulses on output terminal 7, is expressed by $$N \doteq fc/fs \times \psi/360°,$$

(19)

where $fc$ is the repetition frequency of the pulse train, and $fs$ is the signal frequency on input terminal 1 and 2. The number n does not exactly equal ($fc/fs$) × ($\psi/360°$) due to the existence of quantizing error, whose nature is well known in the art and is not further dealt with here. As a quantitative example, $fc = 100$ MHz and $fs = 1$ MHz results in a resolution of digital phase measurement in amount of 360°/100° and the number n on output terminal 7, is (360/100) × n. By suitably choosing the values of $fc$ and $fs$ desired resolution is easily achieved.

While the measuring process of FIG. 10 has been described assuming a continuous wave input signals, pulsed signals can also be handled if there are more than several cycles of carrier waves within the pulse envelope: the phase difference between said carrier waves is measured Input signals in the form of successive pulses, each pulse having different value of phase differences between carrier waves, can also be handled: digital phase difference measurement is performed for each pulse on real time basis.

Figures 11, 12:
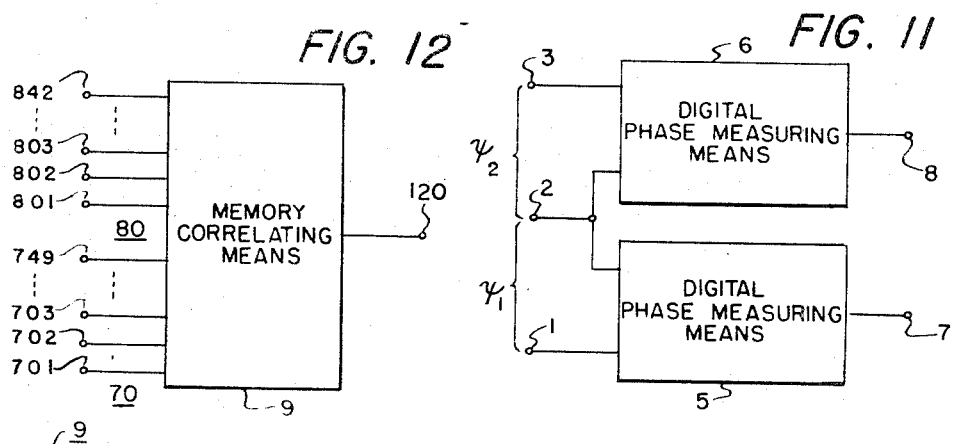
FIG. 11 is a diagram in schematic form of the means shown in FIG. 8, arranged in a particular configuration suitable to be combined with the antenna array system of FIG. 1.
FIG. 12 is a diagram in schematic form of an example of phase-difference-to-angle correlating means that constitutes a part of an embodiment of the present invention.

FIG. 11 shows phase difference measuring means according to FIG. 9, arranged in a particular configuration suitable for application to the present example, and in which 5 and 6 are digital phase measuring means, so made as to yield phase difference values in digital form with a resolution of 360°/49° on output terminal 7, and with 360°/42° on output terminal 8. Other like Characters indicate like parts as in FIG. 5. While the output terminals 7 and 8 are indicated by one line each, each of them may actually consist of several signal lines according to the code form of digital signal; for instance, in case of binary code, the phase difference values of 360°/49° or 360°/42 can be represented by generating either "0" or "1" signal on certain number of lines, which number, $x$, is determined by:

$$2^x \geq 49 \text{ or } 2^x \geq 42.$$

consequently the output terminals 7 and 8 may each consists of six lines. Each of terminals 7 and 8, nevertheless, can be handled as single channels, and they can be shown figuratively by single lines for the benefit of simplicity.

Embodiment of Phase-Difference To Angle Correlating Means.

Refering now to FIG. 12, there is shown an example of phase-difference-to-angle correlating means that constitutes a part of the invention, in which 70 is an input terminal group comprising 49 input terminals 701, 702, 703, ..., 749, on one of which it is expected that a signal is present; 80 is an input terminal group comprising 42 input terminals 801, 802, 803, ..., 842 on one of which it is expected that a signal is present; and 9 is a memory correlating means whose function is to detect on which of the terminals 7$i$ ($i = 01, 02, 03, \ldots 49$) a signal is present, and likewise on which of the terminals 8$j$ ($j = 01, 02, \ldots 42$) a signal is present, then to select the corresponding value of incident angle making use of previously memorized relationship therebetween, and to yield the value onto the output terminal 120. Such a function of memory correlating means may be realized, for example, in accordance with FIG. 13.

Figure 13:
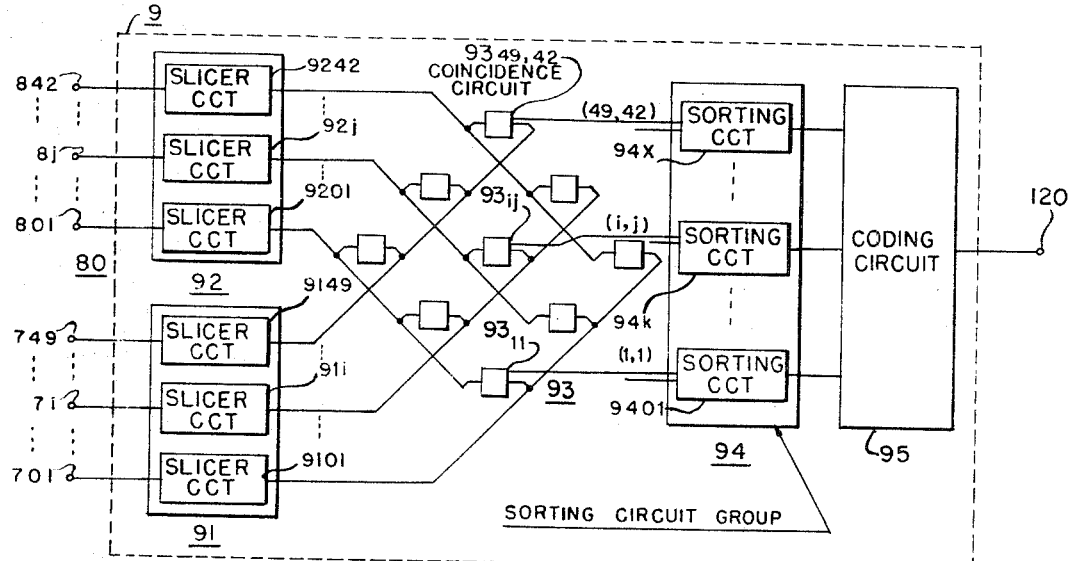
FIG. 13 is a diagram showing an example of internal structure of the means shown in FIG. 12.

In FIG. 13, 91 and 92 are slicer circuit groups each of whose slicer circuits, $91i$ ($i = 01, 02, \ldots 49$) and $92j$ ($j = 01, 02, \ldots 42$), function in like manner as 501 and 502 of FIG. 9; 93 is a coincidence circuit matrix comprising many coincidence circuits $93ij$ ($i = 1, 2, \ldots 49$, $j = 1, 2, \ldots 42$) whose function is to produce an output signal on output terminal $(i, j)$ when input signals are present on both inputs terminals $7i$ and $8j$; 94 is a sorting circuit group comprising sorting circuits $94k$ ($k = 01, \ldots x$) whose function is to sort and combine the outputs of coincidence circuit matrix 93 in suitable combination and to produce one output signal per one said combination; and 95 is a coding circuit that receives the outputs of sorting circuit group 94 and produce one numeric value of corresponding incident angle per one input, said numeric value being yielded onto an output terminal 10 in binary, decimal or other suitable code form.

Supposing now that there are signals coming into terminals $7i$ and $8j$, they are quantized by slicing circuits $91i$ and $92j$ and are applied to coincidence circuit matrix 93, to produce signal on terminal $(i, j)$, which in turn is applied to coding circuit 95 via sorting circuit $94k$. Assuming the code form to be binary, there are $y$ numbers of output lines on which are obtained the binary numeric value of incident angle that corresponds to $x$ numbers of outputs of sorting circuit group 94, said $x$ and $y$ being related to each other by $2^y \quad x$. The $y$ lines of output, however, are figuratively shown by a single line as the output terminal 120, due to the same consideration as given in relation to FIG. 11.

In the above correlation process, it is not always necessary to correlate every set of $(i, j)$ to one particular value of incident angle; rather, a number of sets of $(i, j)$ may be sorted and made into a suitable combination within the sorting circuit group 94, and then each of such combinations may be correlated to one value of incident angle. Said combination can be freely and easily made by arranging the wiring connections between the coincidence circuit matrix 93 and the sorting circuit group 94.

Figure 15:
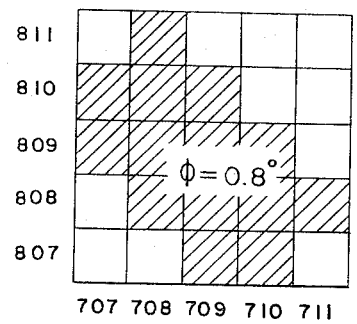

The above embodiment of memory correlating means will be more clearly understood through a more quantitative explanations that follow. An incident angle in the vicinity of 1 degree is taken as an instance.

a. When signals are present on the input terminals 711 and 811, this is correlated to a value of incident angle, 1.0°.

b. When on the input terminals 710 and 810, also correlated to 1.0°.

c. When on 709 and 811, the same as above.

d. When on 710 and 811, the same as above.

e. The same as above when signals are present on a total of 14 sets of input terminal combinations graphically shown by shaded area in FIG. 14; these 14 sets are treated as one group and are correlated to 1.0° incident angle.

f. likewise, when signals are present on a total of 14 sets of input terminal combinations graphically shown by shaded area in FIG. 15, they are treated as another group and are correlated to 0.8° incident angle.

g. Other sets of input terminal combinations are similarly correlated to other angle values, through the reasons and procedures to be described later.

As the incident angle continuously varies, the sets of phase differences correlated to it also vary; it is one of the features of the present invention that, while one of the phase differences varies from 0° to 360°, there occurs, at least once, a point where either the value of other phase difference that has so far been made a set therewith is no longer so, or the value of other phase difference that has not so far been made a set is now made a set therewith. To illustrate this with the instances of FIGS. 14 and 15, it is seen that, when the incident angle varies continuously from 0.8° to 1.0°, one of the phase differences varies from a value corresponding to input 808 to another value corresponding to 809; while the values of another of phase differences that are made set with 808 has been 708 through 711, those that are made set with 809 now include 712 which has not so far been made set with. On the other hand, when 811 goes to 812, 708 is no longer made set with. This is one of the features of the invention, the reason for which will be described later in relation to FIG. 23.

Figure 14:
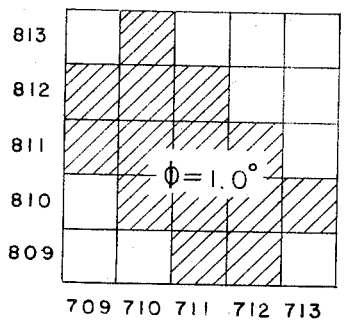
FIGS. 14 and 15 are descriptive graphic diagrams showing the function of the means shown in FIG. 13.

While graphic descriptions similar to FIGS. 14 and 15 will often be used hereafter, it is solely for the purpose of brevity; for instance, FIG. 14 was used to avoid a 14-time repetition of such sentences as "When signals are present on the input terminals 711 and 811, this is correlated to a value of incident angle, 1.0°." Let it be understood, then, that fourteen actual wirings are incorporated within the memory correlating means in accordance with FIG. 14; similar graphic descriptions hereafter are not abstract explanation of mere concepts, but are explanations of concrete embodiment of related devices.

Figure 16:
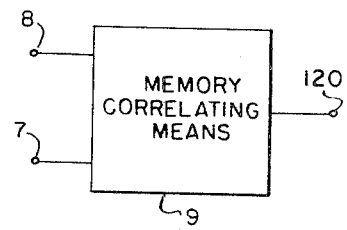
FIG. 16 is a diagram in schematic form of another example of phase-difference-to-angle correlating means that constitutes a part of an embodiment of the present invention.

Refering next to FIG. 16, there is shown another example of phase-difference-to-angle correlating means that constitutes a part of the invention, in which 7 and 8 are input terminals on which it is expected that phase difference values in digital form are present and 9 is a memory correlating means whose function is to select a value of corresponding incident angle according to the phase difference values on terminals 7 and 8, making use of previously memorized relationship therebetween. Such a function of memory correlating means may be realized, for example, in accordance with FIG. 17.

Figure 17:
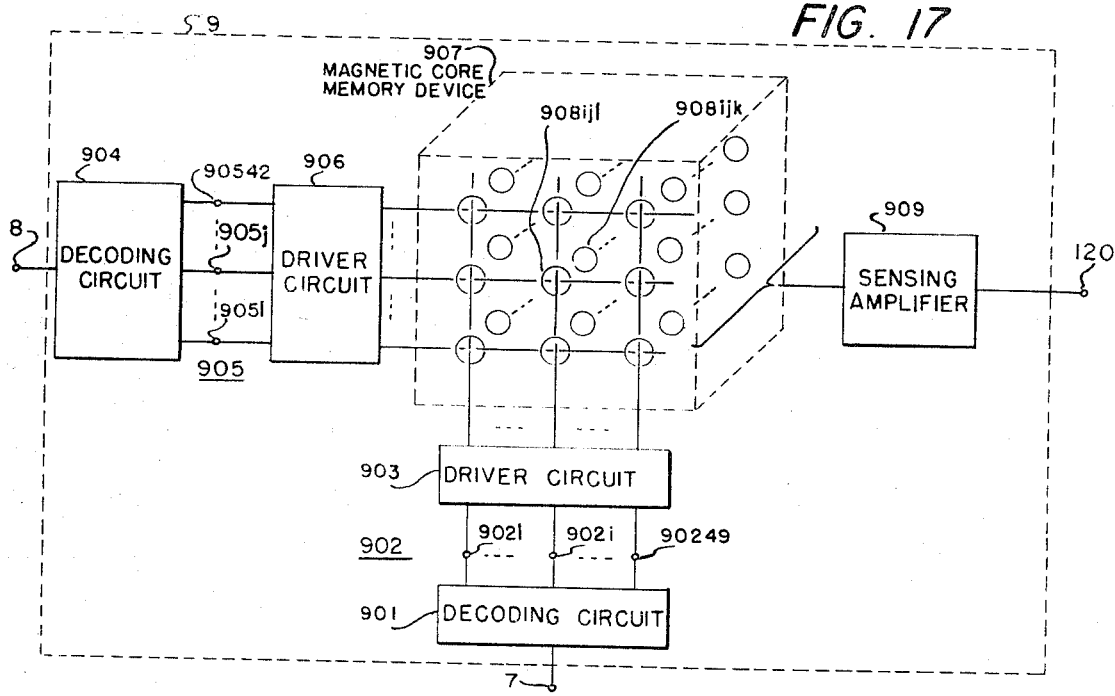
FIG. 17 is a diagram showing an example of internal structure of the means shown in FIG. 16.

A memory correlating means utilizing a magnetic core memory device is shown in FIG. 17, in which 901 and 904 are decoding circuits, 902 and 905 are decode output terminal group, 903 and 906 are driver circuits, 907 is a magnetic core memory device with many magnetic cores as $908\ ijk$, and 909 is a sensing amplifier. It is known in the art that such a part of data that can be simultaneously stored or read out is refered to as a word, and that a word is stored in a plurality of magnetic cores. In the present instance the words are aligned in a checker-board pattern, so to speak; decode outputs $902i$ and $905j$ in FIG. 17 are applied, via the winding drivers 903 and 906, to magnetic cores in across and down fashion respectively, intersecting at the magnetic core $908\ ijl$ where both outputs go through the core. Only when both decode outputs are present at a particular core does the magnetic core memory device produce an output signal.

Supposing now that there are signals in binary code form at input terminals 7 and 8, they are decoded by decoding circuits 901 and 904 into appropriate number of channels. The number for the present instance being 49 and 42, the decode output terminal group comprises terminals 902 $i$ ($i = 1, 2, \ldots 49$), of which a signal is present on only one terminal at a time, and terminals 905 $j$ ($j = 1, 2, \ldots 42$), of which a signal is present on only one terminal at a time. Said signals, via the driver circuits 903 and 906, are applied to the magnetic core memory device to drive the cores. The magnetic core memory device is equipped with sufficient number of cores per word to store the value of incident angle that is to be correlated to the input signals at terminals 7 and 8, and the values of incident angle are previously stored therein, with the result that the incident angle is read out and appear on output terminal 120 via the sensing amplifier 909. Such conventional functions of magnetic core memory device as timing generating circuits, memory control circuits and the like, are assumed to be incorporated, although no reference has so far been made thereto, because they are well known in the art and do not particularly concern the scope of the invention.

Memory correlating means of similar function can also be realized utilizing known magnetic drum memory device or disc memory device, with which it is possible, as with magnetic core memory device, to specify the address of stored memory and to read out the stored values; those other types of memory device, if equipped with enough number of addresses and made to store the values of incident angle to be correlated, can serve the similar purpose of reading out and producing of incident angle onto the output terminal 120.

The memory correlating means thus realized, then, is made to store such information, for example, as shown in FIG. 14. On input terminal 7 is present a signal representing phase difference $\psi_1$, in digital form and with a 360°/49° resolution, that is a signal that corresponds to one of $i = 1, 2, 3, \ldots 49$ cases of equation (17); and on input terminal 8 is present a signal representing phase difference $\psi_2$ in digital form and with a 360°/42° resolution, that is a signal that corresponds to one of $j = 1, 2, 3, \ldots 42$ cases of equation (18). The information to be stored can be expressed by aforementioned FIGS. 14 and 15, if the above signals are regarded in a manner similar to the signals on terminals 7i and 8j in reference to FIGS. 14 and 15.

Embodiment of the entire apparatus

Figure 18:
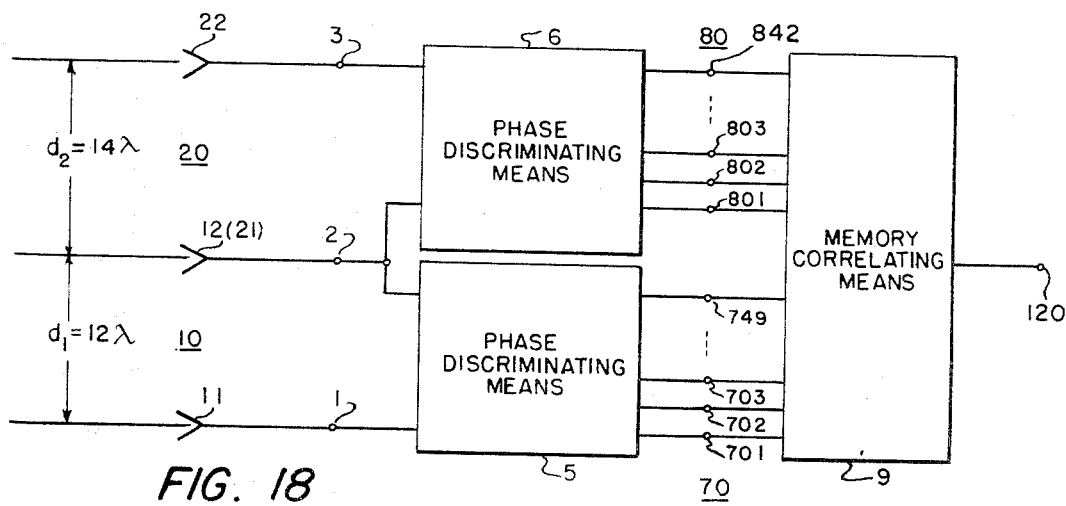
FIG. 18 is a diagram in schematic form of an embodiment of the present invention, constituted by the means shown in FIGS. 1, 5 and 12.

Refering now to FIG. 18, there is shown an embodiment of the present invention comprising, in combination, aforementioned antenna array system, phase difference measuring means and phase-difference-to-angle correlating means; because every parts and characters thereof correspond precisely to those of FIGS. 1, 5 and 12, of which detailed descriptions have been already given, it is apparent that no further identifications are necessary.

Refering next to FIG. 19, there is shown another embodiment of the present invention; because every parts and characters thereof correspond precisely to those of FIGS. 1, 11 and 16, of which detailed descriptions have been already given, it is apparent that no further identifications are necessary.

Let it be noted here that such devices as frequency converters and amplifiers may be inserted between the terminals 1, 2, 3 and the phase difference measuring means 5, 6, so long as said devices are so constructed as to preserve the phase difference between the terminals; since such insertion does not affect the scope of the invention, said devices are not shown in the figures.

Further descriptions of functions of the embodiment are given below, taking as example the apparatuses heretofore described in reference to FIGS. 1 through 19. Supposing that there is a radio signal coming from the direction of incident angle 1.0°, it can be seen from the equations (14) and (15) that phase differences ($\psi_1$, $\psi_2$) in amount of $$\psi_1 = 75.4°, \psi_2 = 88.0°$$

are obtained. In comparison with the equations (17) and (18), they correspond to $i = 11$ and $j = 11$ cases therein, thereby causing the phase discriminating means 5 and 6 of FIG. 18 to produce signals on output terminals 711 and 811; the memory correlating means 9, then, produces a signal on output terminal that indicates the incident angle to be 1°. The same description can be applied to FIG. 19; the digital phase measuring means 5 and 6 produce digital signals whose values correspond to $i = 11$ and $j = 11$ cases in the equations (17) and (18). A reference to FIG. 2 of phase locus within the ($\psi_1$, $\psi_2$) plane also makes this clear: the ($\psi_1$, $\psi_2$) coordinates of the point on locus that corresponds to $\phi = 1°$ are (75.4°, 88.0°) as shown in FIG. 20. For brevity, the following expression will hereafter be used: "Measured values of phase difference $(i, j) = (11, 11)$."

The foregoing is valid when error in phase difference measurement is absent. In actual cases, however, measured values of ($\psi_1$, $\psi_2$) contain errors arising from various conditions of wave propagation, equipment stability and the like, causing the measured values to fluctuate around the true value (75.4°, 88.0°) as a probability density function. An example of such a function is conceptually shown in FIG. 21, where the variance of function is larger in the direction parpendicular to the phase locus than in the direction parallel thereto. It being one of the features of the invention to supply a phase-difference-to-angle correlating means to maximize the possibility of accurate angle measurement even under the presence of phase error, considerations are paid to the following points:

1. Domain of sets of phase differences ($\psi_1$, $\psi_2$) to which a certain value of incident angle is correlated (to be refered to as "phase domain".);

2. Change of said phase domain as the incident angle assumes various values; and 3. The role played by the resolution of phase difference measurement in the above process;

of which more detailed descriptions appear below.

1. Domain of sets of phase differences ($\psi_1$, $\psi_2$) to which a certain value of incident angle is correlated.

It has been stated that the measured values of ($\psi_1$, $\psi_2$) corresponding the incident angle $\phi = 1.0°$ are ($\psi_1$, $\psi_2$) = (75.4°, 88.0°). When values fluctuate by superposed errors as a distribution density function as in FIG. 21, the measured values of ($\psi_1$, $\psi_2$) assumes a nature closer to an incident signal from the vicinity of $\phi = 26°$ or $\phi = 5.5°$ than to that from $\phi = 1.0°$ as the amount of error increases; it is therefore important to decide what domain of sets of ($\psi_1$, $\psi_2$) should be correlated to $\phi = 1.0°$. The $\beta_1$ in this case will hereafter be called "phase domain of $\phi = 1.0°$." In order to maximize the possibility of accurate angle measurement, it is desirable to shape said domain on the ($\psi_1$, $\psi_2$) plain so that it best fits the shape of error density distribution, thereby increasing the probability of measured value of ($\psi_1$, $\psi_2$) to fall within the domain. To accomplish this the phase domain does not represent such rectangular shape as $\alpha \leq \psi_1 \leq \beta$, $\gamma \leq \psi_2 \leq \delta$ (where $\alpha$, $\beta$, $\gamma$ and $\delta$ are constants), but it is desirable to make the domain to represent, as a sum of small rectangular shapes, a polygonal shape. In the present instance, the phase domain of FIG. 22 is chosen in an attempt to best fit the probability distribution of FIG. 21; the domain of sets of ($i, j$) of the shaded area therein is correlated to $\phi = 1.0°$. This is the reason of correlation process previously described in reference to FIG. 14.

2. Change of phase domain as the incident angle assumes various values.

Considering next the case of $\phi = 0.8°$, the center of distribution of measured values ($\psi_1$, $\psi_2$) will be at another point along the phase locus, without, however, presumably changing the distribution thereabout. It is therefore desirable to place the phase domain of $\phi = 0.8°$ in such a manner as the phase domain of $\phi = 1.0°$ is displaced by certain distance, the direction of displacement being generally parallel to the phase locus, that is to the slanted lines of FIGS. 21 and 22. The result of thus correlating the phase domains to various values of the incident angle is shown, in part, in FIG. 23, in which it can be seen that phase domains are so aligned as if one domain were repeatedly displaced toward a direction parallel to neither $\psi_1$ nor $\psi_2$ axes, thereby causing the domain boundaries to assume, not plain checkerboard patterns, but step-shaped patterns, said step-shape occuring several times while one of the phase differences varies from 0° to 360°. This is one of the features of the invention that has previously been stated, in reference to FIGS. 14 and 15, as "while one of the phase differences varies from 0° to 360°, there occurs a point where the value of other phase difference that has so far been made a set therewith is no longer so, etc."

3. The role played by the resolution of phase difference measurement in the above process.

Figure 25:
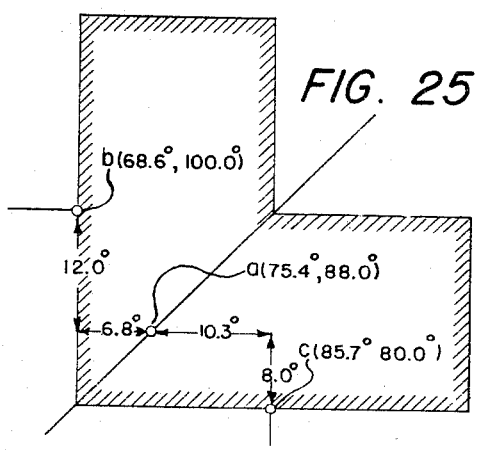
Figure 26:
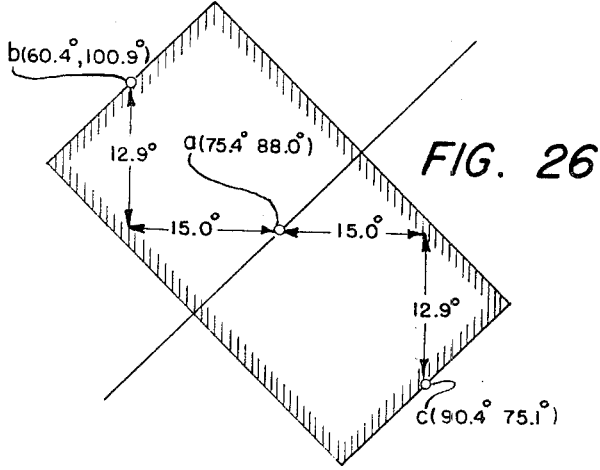

Referring to FIG. 26, there is shown an enlarged view of the phase domain of $\phi = 1.0°$, in which, point a represents the true value corresponding to $\phi = 1.0°$, which means ($\psi_1$, $\psi_2$) = (75.4°, 88.0°), and points b, c are on the boundary of domain. It can easily be understood that measurement errors that do not exceed the point b, that is, in amounts not exceeding −9.3° for $\psi_1$ and +14.9° for $\psi_2$, do not cause erroneous angle measurement; likewise, errors that do not exceed the point c, that is, in amounts not exceeding +12.8° for $\psi_1$ and −10.9° for $\psi_2$, do not cause erroneous angle measurement. This is a result of 360°/49° resolution in $\psi_1$, and 360°/42° in $\psi_2$. For purpose of comparison, effects of different values of resolution will be briefly reviewed; higher resolutions mean finer steps in the shape of domain boundaries, thereby permitting the points b and c to be further apart, at the same time allowing a higher degree of freedom in fitting the domain shape to that of error distribution, thus contributing to the maximization of probability of accurate angle measurement; lower resolutions, on the other hand, means the opposite. FIG. 25 is an example of lower resolutions, 360°/21° for $\psi_1$ and 360°/18° for $\psi_2$: not only the distances to the points b and c are less, but also the domain shape is more irregular, and it is easily perceived that the probability of erroneous angle measurement is higher, FIG. 26, on the other hand, is an example of infinite resolutions; not only are the points b and c further apart, but also the domain shape is better fitted, to reduce the probability of erroneous angle measurement.

It is apparent that the resolutions of phase difference measurement of the present invention are determined only by the embodiment of phase difference measuring means, and can be selected independently from the ratio of $d/\lambda$ values of antenna arrays. The resolutions, in particular, can be made to be higher than 360°/100°; a condition close to that of FIG. 26 can be achieved, thereby decreasing the probability of erroneous angle measurement and increasing that of accurate measurement. The ratio of $d/\lambda$ values of antenna arrays can also be chosen in various ways, some examples of which are to be described later.

The numbers (5) and (6) of the aforementioned features of the present invention have been described. Since the numbers (1) through (4) of the features are provided by the prior inventions of some of the present assignors, patented as Japanese Patents 467,818, 501,947, 506,157 and others as has previously been explained, it is concluded that the objects of the present invention are accomplished.

Various different embodiments of the invention can be made without departing the spirit thereof, and some of other possible embodiments are shown below.

A. Embodiment with different ratio of $d/\lambda$ values.

Figure 27:
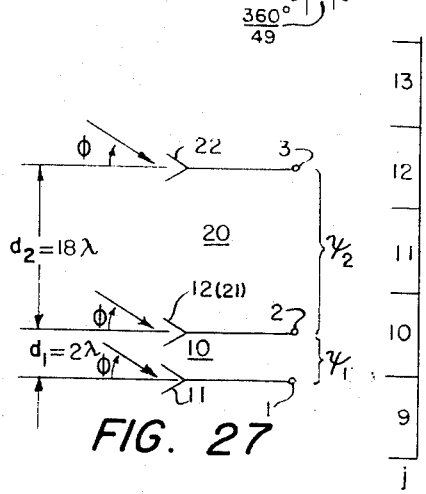
FIG. 27 is a diagram of another example of antenna array system utilized in the present invention.
Figure 24:
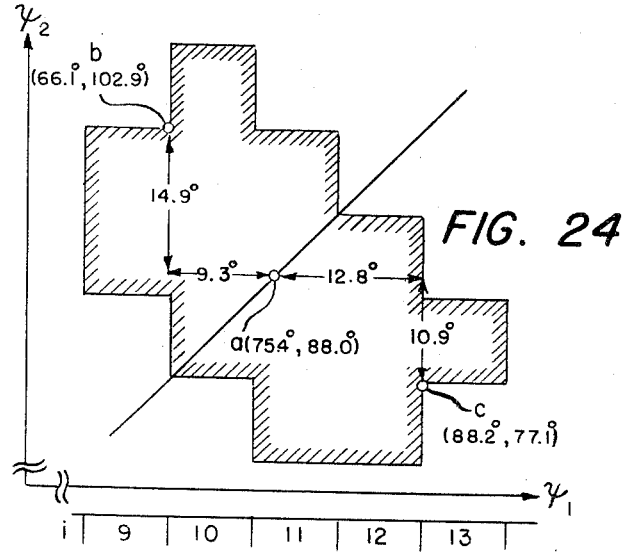
FIGS. 24 through 26 are descriptive graphic diagrams showing influence of the resolution of phase difference measurement in the present invention.

While the ratio of $d/\lambda$ values (where d is the interelement spacing of the antenna array, $\lambda$ the propagation wavelength) of previous example was 6 : 7 and thus close to unity, an embodiment with much different ratio is possible. FIG. 27 shows such an example, in which like characters indicate like parts as FIG. 1, and in which $$d_1 = 2\lambda, \tag{20}$$

$$d_2 = 18\lambda, \tag{21}$$

thus the ratio of $d/\lambda$ values is 1 : 9, much different from the previous example. Consequently, phase differences $\psi_1$ and $\psi_2$ are given by $$\psi_1 = (2\pi/\lambda) d_1 \sin\phi = 2 \times 360° \sin\phi, \tag{22}$$

$$\psi_2 = (2\pi/\lambda) d_2 \sin\phi = 18 \times 360° \sin\phi, \tag{23}$$

$$\psi_1 = \psi_2/9 \tag{24}$$

Figure 29:
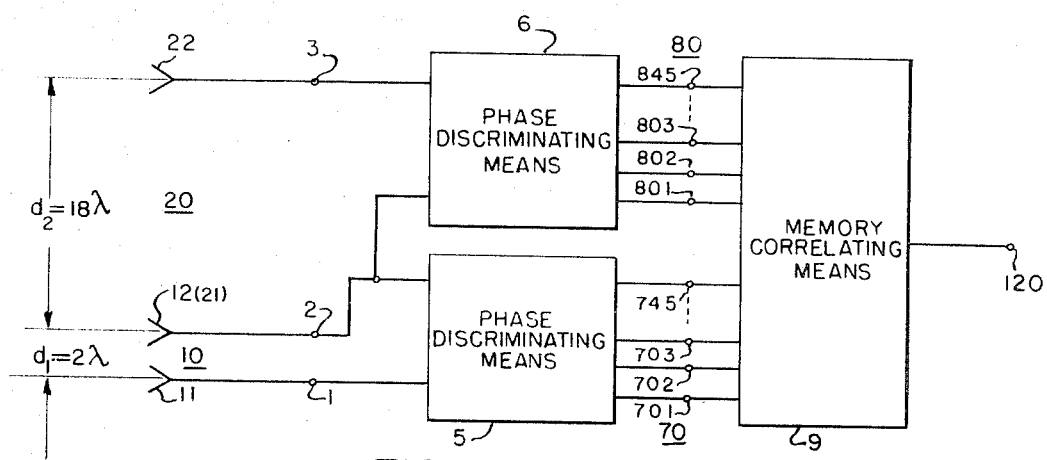
FIG. 29 is a diagram in schematic form of an embodiment of the present invention, utilizing the antenna array system of FIG. 27.
Figure 28:
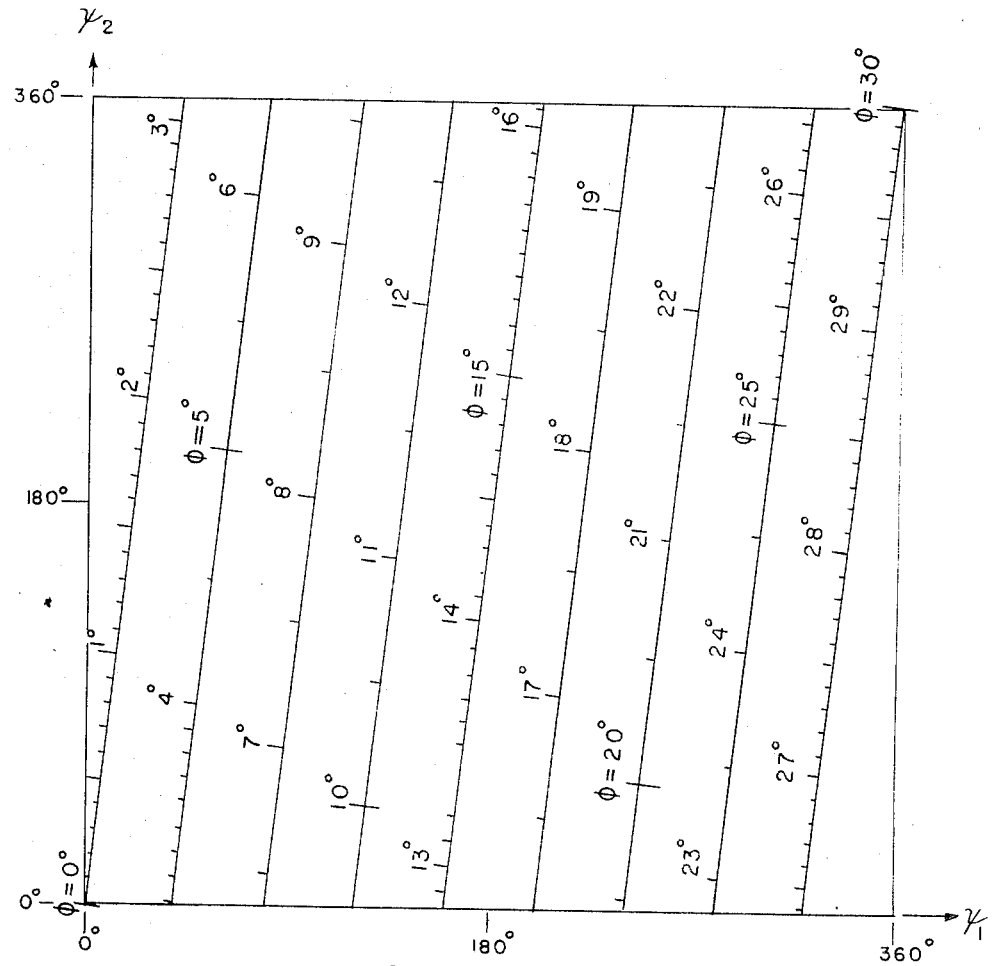
FIG. 28 is a graphic diagram showing the functional relationship between the signal incident angle and phase differences in relation to the antenna array system of FIG. 27.

Graphical representation of the phase locus determined by equation (24) is shown in FIG. 28, in which the corresponding values of $\phi$ is shown on scale, and the unambiguous sector in this instance is 0° to 30°. In FIG. 29 there is shown an entire apparatus utilizing the above antenna array, each part of which corresponding to that in FIG. 18, with the exception of resolution of phase difference measurement of phase discriminating means 5 and 6. Said resolution is chosen to be 360°/45° for both of said two means, which consequently have 45 output terminals 701, 702, 703, . . . 745 and 801, 802, 803, . . . 845 respectively. The function of memory correlating means 9 is different from that of FIG. 23, and it correlates the phase differences to incident angle in a manner shown, in part, in FIG. 30. While the phase locus is parallel to neither $\psi_1$, nor $\psi_2$ axes, its direction is closer to that of $\psi_2$ axis than in the previous example, with the result that configurative difference exits in the alignment of phase domains between FIGS. 23 and 30. It can be seen, however, that the spirit of the invention is preserved, in that: (a) the probability of erroneous angle measurement is expected to be small with phase domains of such rectangular shape as represented by $\alpha \leq \psi_1 \leq \beta$ and $\gamma \leq \psi_2 \leq \delta$ (where $\alpha$, $\beta$, $\gamma$ and $\delta$ are constants); (b) since the direction of phase locus is close to that of $\psi_2$ axis, not all phase domain are aligned as if one domain were repeatedly displaced in the direction of the phase locus; the fact remains, however, that the domain boundaries assume, not plain checker-board patterns, but step-shaped patterns, said step-shape occuring as often as five times as $\psi_2$ varies from 0° to 360°, thus preserving a feature of the invention. While the description so far concerned an embodiment utilizing phase discriminating means similar to that of FIG. 18, it is apparent that the digital phase difference measuring means similar to that of FIG. 19 may be used to similar effect.

It should be noted in reference to the present instance that while the unambiguous sector of 0° to 30° can be achieved by the antenna array system of $d/\lambda = 2$, the incorporation of another antenna array system of $d/\lambda = 18$ has considerably increased the tolerance for the measurement error of phase differences: in order to keep the angular accuracy of 0.2° with the system of $d/\lambda = 2$ alone, the phase tolerance is only $\pm 1.26°$ as seen by putting $\phi = 0.2°$ in equation (22):

$$\psi_1 = 2 \times 360° \times \sin 0.2° = 2.52°.$$

Figure 30:
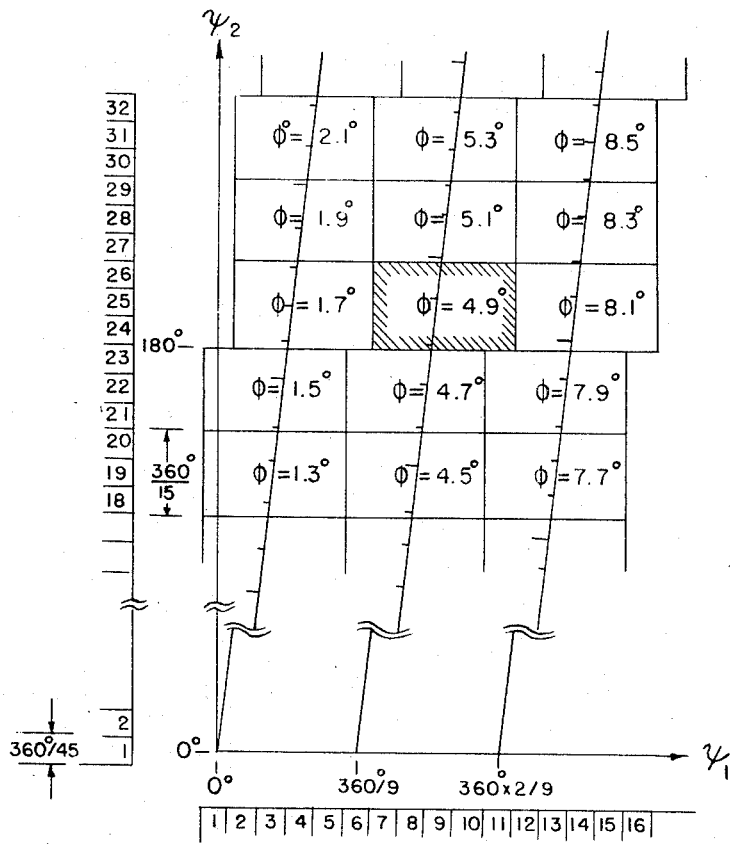
FIG. 30 is a descriptive graphic diagram showing the function of the embodiment shown in FIG. 29.

In comparison, when the system of $d/\lambda = 18$ is used in combination therewith, a considerably increased phase tolerances of approximately $\pm 20°$ for the system of $d/\lambda = 2$ and approximately $\pm 12°$ for the system of $d/\lambda = 18$, as is graphically seen from FIG. 30:

$$\psi_1 = 360°/9 = 40°, \psi_2 = 360°/15 = 24°.$$

B. Embodiment with different combination of antenna arrays.

Figure 32:
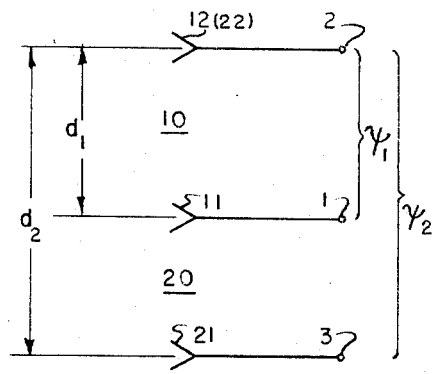
Figure 31:
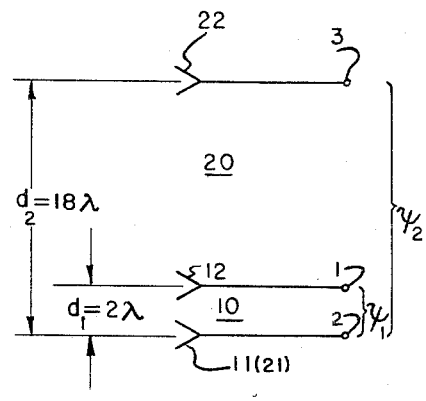

While the inter-element phase difference has so far been limited to that between neighboring radiator elements, different combination is possible. In FIG. 31 there is shown an example of such an antenna array system which produces inter-element phase differences identical to that of FIG. 27, yet is different therefrom in that an array of spacing $d_2 = 18\lambda$ is formed by the two radiators furthest apart from each other, resulting in a smaller overall array aperture span. It is possible to form an array by combining the radiator elements furthest apart from each other, as shown in FIG. 32, and to use the inter-element phase difference therebetween; overall array aperture span is generally smaller in such an application than in examples such as FIGS. 1 and 27.

(C) Embodiment with three or more antenna arrays.

Figure 33:
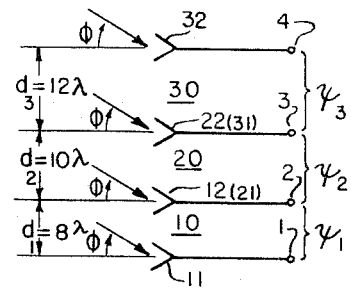
FIGS. 31 through 33 are diagrams of three other examples of antenna array systems utilized in the present invention.

While the number of $d/\lambda$ values has so far been limited to two, it is possible to use three such values. In FIG. 33 there is shown such an example of antenna array system, in which 10, 20 and 30 are three antenna arrays with three values of $d$, that is, $d_1$, $d_2$ and $d_3$ respectively, and with a common value of $\lambda$. The three arrays comprise radiator elements 11, 12, 21, 22 and 31, 32 respectively; the figure shows the case where two radiator elements are used commonly by two arrays each, as designated 12(21) and 22(31), thus making the total number of radiator elements four, each of which produces an output to output terminals 1, 2, 3 and 4. Phase differences $\psi_1$, $\psi_2$ and $\psi_3$ are observed between the terminals 1 and 2, 2 and 3, and 3 and 4 respectively. Supposing that there is a radio signal coming from the direction of incident angle $\phi$, measured from array broadside, the following equations hold in place of equations (4), ( 5) and (13):

$$\psi_1 = (2\pi/\lambda) d_1 \sin \phi, \tag{25}$$

$$\psi_2 = (2\pi/\lambda) d_2 \sin \phi, \tag{26}$$

$$\psi_3 = (2\pi/\lambda) d_3 \sin \phi, \tag{27}$$

$$\psi_1/d_1 = \psi_2/d_2 = \psi_3/d_3 \tag{28}$$

Equation (28) represents a straight line within the ($\psi_1$, $\psi_2$, $\psi_3$) space, which line will hereafter be called a "phase locus." The graphic representation thereof is in FIG. 34, by observing which it can be seen that due to the three-dimensionalization of the heretofore two-dimensional phase space, there is more room between the neighboring sectors of phase locus, which clearly suggests a larger phase tolerances than was formerly possible; this is the advantage of utilizing three $d/\lambda$ values. FIG. 35 is an embodiment of the invention in relation to such antenna array system as above, in which 5, 6 and 61 are phase discriminating means similar to those in FIG. 3. Each of said phase discriminating means discriminate the phase difference $\psi_1$, $\psi_2$ or $\psi_3$ with resolutions of $360°/p°$, $360°/q°$ or $360°/r°$ respectively and produce output signal on output terminal group 80, 90 or 100 respectively, comprising output terminals $8i$, $9j$ or $10k$ ($i = 1, \ldots p, j = 1, \ldots q, k = 1, \ldots r$). 110 is a memory correlating means similar to that of FIG. 12 whose function is to detect on which of the terminals $8i$, $9j$ and $10k$ the signals are present, then to select the corresponding value of incident angle making use of previously memorized relationship therebetween, and to yield the value onto the output terminal 110; such means can be realized in a manner similar to that of FIG. 13, the only major difference being the fact that there are now three input variables. It is apparent that the digital phase difference measuring means similar to that of FIG. 17 may be used to similar effect.

It is again apparent that inter-elemental phase difference need not be that between the neighboring elements, but it is possible to form arrays by combining one radiator element with next but one or two radiators and to use the phase difference therebetween; such an example is shown in FIG. 36. It is further apparent that embodiments with four, five, etc. different values of $d/\lambda$ may also be used.

D. Embodiment with two or more frequencies.

While the means to realize two or more $d/\lambda$ values has so far been limited to use two or more values of d and one common value of λ, it is possible to use one common value of d and two or more values of λ, hence two or more frequencies. In FIG. 37 there is shown such an example, in which 10 is an antenna array comprising radiator elements 11 and 12, which receive signals of wavelengths $\lambda_1$, and $\lambda_2$ (frequencies $f_1$ and $f_2$), which in turn are filtered and divided into $f_1$ and $f_2$ components by filtering means 300 and 400. Phase difference measurement and phase-difference-to-angle correlation are performed on each of said components and incidence angle value is obtained therefrom. If we choose $$d/\lambda_1 = 12 \text{ and } f_1/f_2 = 6/7,$$

then $a/\lambda_2 = 14$, and the embodiment is equivalent to that of FIG. 18. Other like characters in FIG. 37 indicate like parts as in FIG. 18. This embodiment has an obvious advantage of requiring only a minimum of two radiator elements. It is apparent that the digital phase difference measuring means similar to that of FIG. 19 may be used to similar effect. It is further apparent that such various combined applications are possible as, for example, employing two values of wavelengths $\lambda_1$ and $\lambda_2$ and two values of inter-element spacings $d_1$ and $d_2$, thus realizing a maximum of four different values of $d/\lambda$.

E. Embodiment with different number of radiator elements.

While the number of radiator elements per array has so far been limited to the minimum value of two, it is apparent that antenna arrays of more than two radiator elements may be used.

F. Embodiment with modified phase-difference-to-angle correlation, (1).

Figure 38:
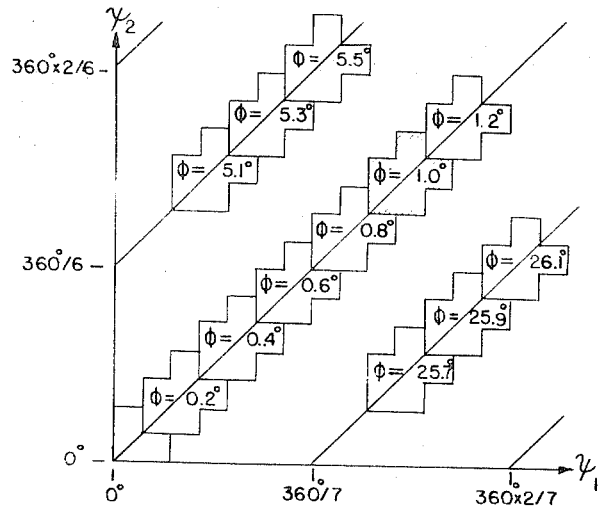
FIG. 38 is a descriptive graphic diagram showing a function of the means shown in FIG. 18, when the means is so made as to function in a slightly different manner from that of FIG. 23.
Figure 39:
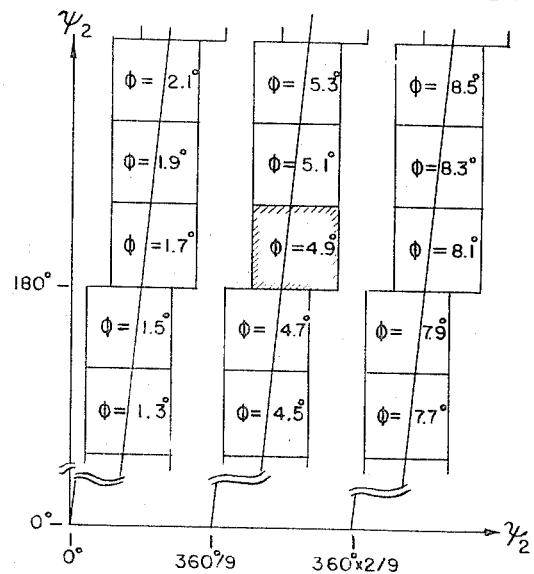
FIG. 39 is a descriptive graphic diagram showing a function of the means shown in FIG. 29, when the means is so made as to function in a slightly different manner from that of FIG. 30.

While the phase-difference-to-angle correlation so far has been such that every possible set of ($\psi_1$, $\psi_2$) has certain value of incident angle to be correlated to, it is not a necessity. In FIGS. 38 and 39 there are shown other examples, where the sets of ($\psi_1$, $\psi_2$) in the vicinity of phase locus are correlated to incident angle, while those in the middle of neighboring sectors of phase locus are not correlated to any value. Consequently the phase domains are smaller, with the result that the probability of, say, signal of $\phi = 1.0°$ to be accurately correlated to 1.0° is slightly smaller in FIG. 38, but the probability of said signal to be erroneously correlated to 26.1 degrees or 5.5 degrees is also decreased; the same is true for FIG. 39. Such a correlation method, of providing "empty plots" so to $\phi$ is effective when the measuring errors of phase difference are small. G. Embodiments with modified phase-difference-to-angle correlation, (2).

Figure 23:
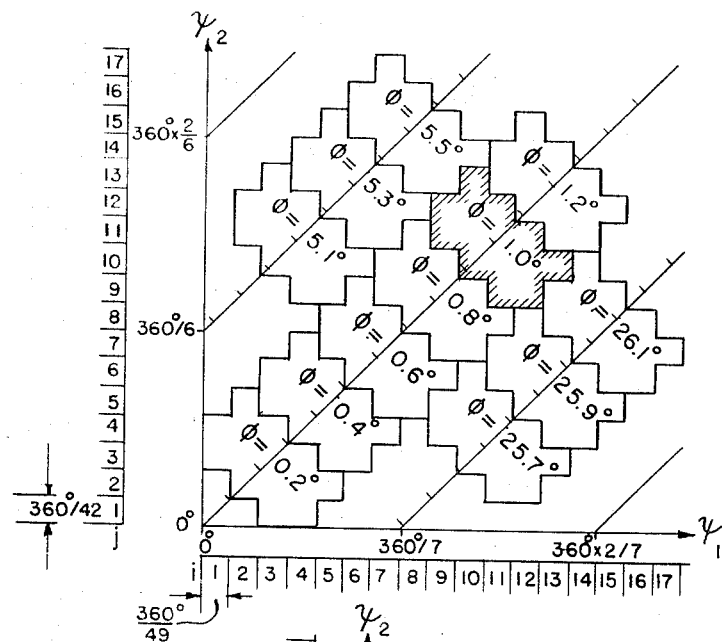
Figure 40:
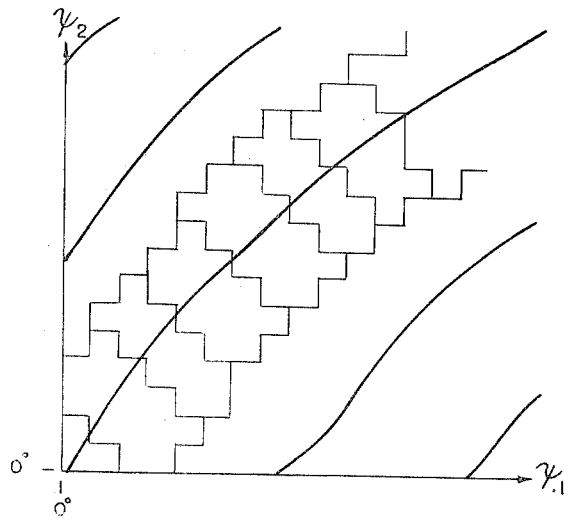
FIG. 40 is a descriptive graphic diagram showing an example of another function of an embodiment of the present invention.

It has so far been assumed that the relationships between the incident angle $\phi$ and phase differences $\psi_1$, $\psi_2$, etc. are expressed by equations (4), (5), (27) etc., and that resultant phase loci are, as in equations (13), (28), etc., straight lines within the phase plane($\psi_1$, $\psi_2$) or phase space ($\psi_1$, $\psi_2$, $\psi_3$), etc. It has further been assumed that even when errors exit, the above holds true for average values of each variables. Possibity exists, however that, due to the unbalance in the antenna element characteristics, receiver channel characteristics and the like, factors other than those in equations (4), (5), (27), etc. may be present on the right-hand side thereof with the result that, even after averaging, the phase loci are not found to be straight lines; in that case, the alignment of phase domains and correlation thereof to the incident angle as shown in FIGS. 23, 38, etc., may be inadequate and may result in higher probability of erroneous angle measurement. The high resolution of phase difference measurement, however, can be used to advantage even in such a case; it is possible to realign the phase domains to best fit the non-straight phase locus. In FIG. 40 is shown one such example, one way of realizing which is to receive signals form known values of incident angle and store the measured values of phase differences for further correlation; by such a method can be the unbalance of antenna element characteristics and the like be compensated.

We claim as our invention:

1. A radio angle measurement apparatus comprising, in combination: antenna arrays comprising a plurality of radiator elements that are distributed at an inter-element spacing $d$ which is considerably larger than one-half of signal propagation wavelength λ, and providing two or more different values of $d/\lambda$ ratio by employing two or more values of inter-element spacing $d_1$, $d_2$, ... $d_n$, and one common value of propagation wavelength λ, phase difference measuring means for measuring the inter-element phase differences, of which there are at least two: $\psi_1$, $\psi_2$, ... $\psi_n$, in accordance with said at least two values of $d/\lambda$, said phase difference measuring means including a phase discriminating means having a plurality of output terminals for producing quantized phase data, wherein the data produced at said output terminals correspond respectively to predetermined small increments of phase, so that a certain amount of phase difference causes an output signal to appear on a certain corresponding terminal, and a phase-difference-to-angle correlating means which correlates said phase differences to the incident angle value of the signal, making use of either theoretically or experimentally known relationships therebetween, and which produces as its output a signal corresponding to said incident angle value.

2. A radio angle measurement apparatus comprising, in combination: at least one antenna array comprising a plurality of radiator elements distributed equally at an inter-element spacing d which is considerably larger than one-half of a propagation wavelength λ, for exhibiting two or more different values of $d/\lambda$ ratio due to reception of two or more values of propagation wavelength $\lambda_1$, $\lambda_2$, ... $\lambda_n$, phase difference measuring means for measuring the inter-element phase differences, of which there are at least two: $\psi_1$, $\psi_2$, ... $\psi_n$, in accordance with said at least two values of $d/\lambda$, said phase difference measuring means including a phase discriminating means having a plurality of output terminals for producing quantized phase data, wherein the data produced at said output terminals correspond respectively to predetermined small increments of phase, so that a certain amount of phase difference causes an output signal to appear on a certain corresponding terminal, and a phase-difference-to-angle correlating means which correlates said phase differences to the incident angle value of the signal, making use of either theoretically or experimentally known relationships therebetween, and which produces as its output a signal corresponding to said incident angle value.

3. A radio angle measurement apparatus comprising in combination: antenna arrays comprising a plurality of radiator elements that are distributed at an inter-element spacing d which is considerably larger than one-half of the propagation wavelength λ, and exhibiting two or more different values of $d/\lambda$ ratio by employing two or more values of interelement spacing $d_1, d_2, \ldots d_n$ and two or more values of propagation wavelength $\lambda_1, \lambda_2, \ldots \lambda_n$, phase difference measuring means for measuring the inter-element phase differences, of which there are at least two: $\psi_1, \psi_2, \ldots \psi_n$, in accordance with said at least two values or $d/\lambda$, said phase difference measuring means including a phase discriminating means having a plurality of output terminals for producing quantized phase data, wherein the data, produced at said output terminals correspond respectively to predetermined small increments of phase, so that a certain amount of phase difference causes an output signal to appear on a certain corresponding terminal, and a phase-difference-to-angle correlating means which correlates said phase differences to the incident angle value of the signal, making use of either theoretically or experimentally known relationships therebetween, and which produces as its output a signal corresponding to said incident angle value.

4. A radio angle measurement apparatus comprising, in combination: antenna arrays comprising a plurality of radiator elements that are distributed at an inter-element spacing d which is considerably larger than one-half of the signal propagation wavelength $\lambda$, and providing two more more values of $d/\lambda$ ratio by employing two ore more values of interelement spacing $d_1, d_2, \ldots d_n$, and one common value of propagation wavelength $\lambda$, phase difference measuring means for measuring the inter-element phase differences, of which there are at least two: $\psi_1, \psi_2, \ldots \psi_n$, in accordance with said at least two values of $d/\lambda$, said phase difference measuring means comprising digital phase measuring means which measures phase difference directly and with high resolution, and a phase difference-to-angle correlating means coupled to said phase difference measuring means for correlating said phase differences to the incident angle value of the signal, making use of either theoretically or experimentally known relationship therebetween, and which produces as its output a signal corresponding to said incident angle value.

5. A radio angle measurement apparatus as claimed in claim 1, in which the phase-difference-to-angle correlating means comprises means for providing that the domain of the measured sets of said phase differences, $\psi_1, \psi_2, \ldots \psi_n$, to be correlated to certain values of incident angle, represents such rectangular or cubic rectangular shape within the ($\psi_1, \psi_2, \ldots$) space as expressed by $\alpha \leq \psi_1 \leq \beta, \gamma \leq \psi_2 \leq \delta$, etc. (where $\alpha, \beta, \gamma$ and $\delta$ are constants.).

6. A radio angle measurement apparatus as claimed in claim 1, in which the phase-difference-to-angle correlating means comprises means for providing that the domain of the measured sets of said phase differences, $\psi_1, \psi_2, \ldots \psi_n$ to be correlated to certain values of incident angle represents, as a sum of rectangular or cubic rectangular shapes, polygonal or polyhedral shape within the ($\psi_1, \psi_2, \ldots$) space.

7. A radio angle measurement apparatus as claimed in claim 1, in which the phase-difference-to-angle correlating means comprises means for providing that, as one of the phase differences varies from 0° to 360° in accordance with continuous variation of the incident angle there occurs, at least once, a point where the value of another phase difference which is normally included in a set with that of said one of the phase differences is excluded from said set.

8. A radio angle measurement apparatus as claimed in claim 1, in which The phase-difference-to-angle correlating means comprises means for providing that, as one of the phase differences varies from 0° to 360° in accordance with continuous variation of the incident angle, there occurs, at least once, a point where the value of another phase difference which is normally excluded from a set including said one of the phase differences is included therewith in said set.

9. A radio angle measurement apparatus as claimed in claim 4, in which the phase-difference-to-angle correlating means comprises means for providing that the domain of the measured sets of said phase differences, $\psi_1, \psi_2, \ldots \psi_n$ to be correlated to certain values of incident angle, represents such rectangular or cubic rectangular shape within the ($\psi_1, \psi_2, \ldots$) space as expressed by $\alpha \leq \psi_1 \leq \beta, \gamma \leq \psi_2 \leq \delta$, etc. (where $\alpha, \beta, \gamma$, and $\delta$ are constants.).

10. A radio angle measurement apparatus as calimed in claim 4, in which the phase-difference-to-angle correlating means comprises means for providing that the domain of the measured sets of said phase differences, $\psi_1, \psi_2, \ldots \psi_n$ to be correlated to certain values of incident angle represents, as a sum of rectangular or cubic rectangular shapes, polygonal or polyhedral shape within the ($\psi_1, \psi_2 \ldots$) space.

11. A radio angle measurement apparatus as claimed in claim 4, in which the phase-difference-to-angle correlating means comprises means for providing that, as one of the phase differences varies from 0° to 360° in accordance with continuous variation of the incident angle, there occurs, at least once, a point where the value of another phase difference which is normally included in a set with that of saidone of the.phase differences is excluded from said set.

12. A radio angle measurement apparatus as claimed in claim 4, in which the phase-difference-to-angle correlating means comprises means for providing that, as one of the phase differences varies from 0° to 360° in accordance with continuous variation of the incident angle, there occurs, at least once, a point where the value of another phase difference which is normally excluded from a set including said one of the phase differences is included therewith in said set.

13. A radio angle measurement apparatus comprising, in combination: at least one antenna array comprising a plurality of radiator elements distributed equally at an inter-element spacing d which is considerably larger than one-half of a propagation wavelength $\lambda$, for exhibiting two or more different values of $d/\lambda$ ratio due to reception of two or more values of propagation wavelength $\psi_1, \psi_2 \ldots \psi n$, phase difference measuring means for measuring the inter-element phase differences, of which there are at least two: $\psi_1, \psi_2, \ldots \psi_n$, in accordance with said at least two values of $d/\lambda$, said phase difference measuring means comprising digital phase measuring means which measures phase difference directly and with high resolution, and a phase-difference-to-angle correlating means which correlates said phase differences to the incident angle value of the signal, making use of either theoretically or experimentally known relationships therebetween, and which produces as its output a signal corresponding to said incident angle value.

14. A radio angle measurement apparatus comprising, in combination: antenna arrays comprising a plurality of radiator elements that are distributed at an inter-element spacing d which is considerably larger than one-half of the propagation wavelength $\lambda$, and exhibiting two or more different values of $d/\lambda$ ratio by employing two or more values of interelement spacing $d_1, d_2, \ldots d_n$ and two or more values of propagation wavelength $\lambda_1, \lambda_2, \ldots \lambda_n$, phase difference measuring means for measuring the inter-element phase differences, of which there are at least two $\psi_1, \psi_2, \psi_n$ in accordance with said at least two values of $d/\lambda$, said phase difference measuring means comprising digital phase measuring means which measures phase difference directly and with high resolution, and a phase-difference-to-angle correlating means which correlates said phase differences to the incident angle value of the signal, making use of either theoretically or experimentally known relationships therebetween and which produces as its output a signal corresponding to said incident angle value.

* * * * *